United States Patent [19]

Burrus, Jr. et al.

[11] Patent Number: 4,716,523

[45] Date of Patent: Dec. 29, 1987

[54] MULTIPLE PORT INTEGRATED DMA AND INTERRUPT CONTROLLER AND ARBITRATOR

[75] Inventors: Gilbert S. Burrus, Jr., Apex; Ronald J. Cooper, Raleigh; Michael R. Marr; John C. Pescatore, both of Chapel Hill; Mario A. Marsico, Cary, all of N.C.

[73] Assignee: International Business Machines Corporation, Armonk, N.Y.

[21] Appl. No.: 744,852

[22] Filed: Jun. 14, 1985

[51] Int. Cl.⁴ .............................................. G06F 13/32
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,034,349 | 7/1977 | Monaco et al. | 364/200 |
| 4,067,059 | 1/1978 | Drechar | 364/200 |
| 4,215,400 | 7/1980 | Denko | 364/200 |
| 4,417,304 | 11/1983 | Dinwiddie, Jr. | 364/200 |
| 4,458,313 | 7/1984 | Suzuki et al. | 364/200 |
| 4,615,019 | 9/1986 | Bonci | 364/900 |

OTHER PUBLICATIONS

"82258 Advanced DMA Controller Architectural Overview," Intel Corporation, 1984.

*Primary Examiner*—Emanuel S. Kemeny
*Assistant Examiner*—David L. Clark
*Attorney, Agent, or Firm*—Edward H. Duffield

[57] ABSTRACT

Both DMA access and character interrupt driven access modes of service are provided to multiple communication ports by an integrated arbitration DMA/interrupt controller utilizing its own resident randomly accessible memory. Pipelined logic control architecture for handling service mode adaptations for each individual port and for managing memory accesses to main system memory enables the use of the random access memory with its inherent time delays in a manner that virtually eliminates the effect of any time delay in overall memory access throughput.

17 Claims, 24 Drawing Figures

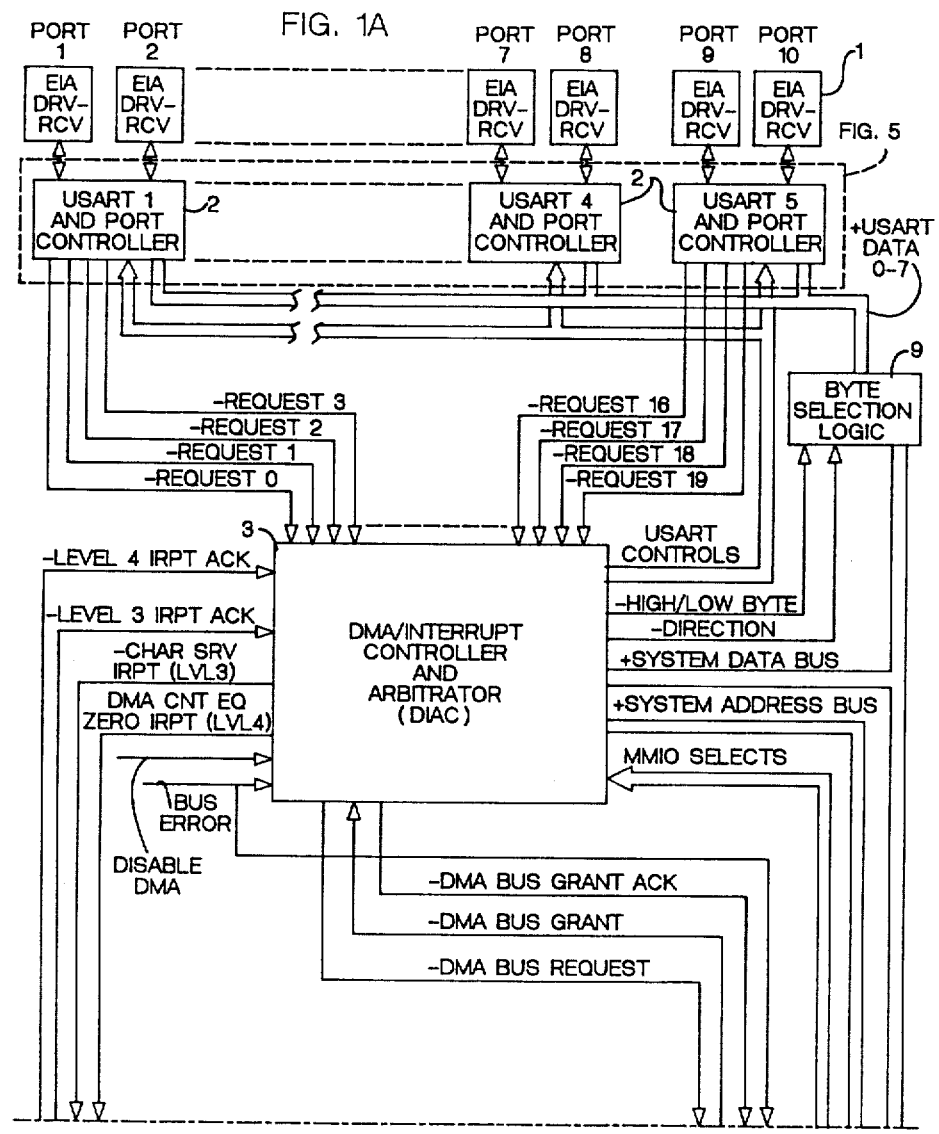

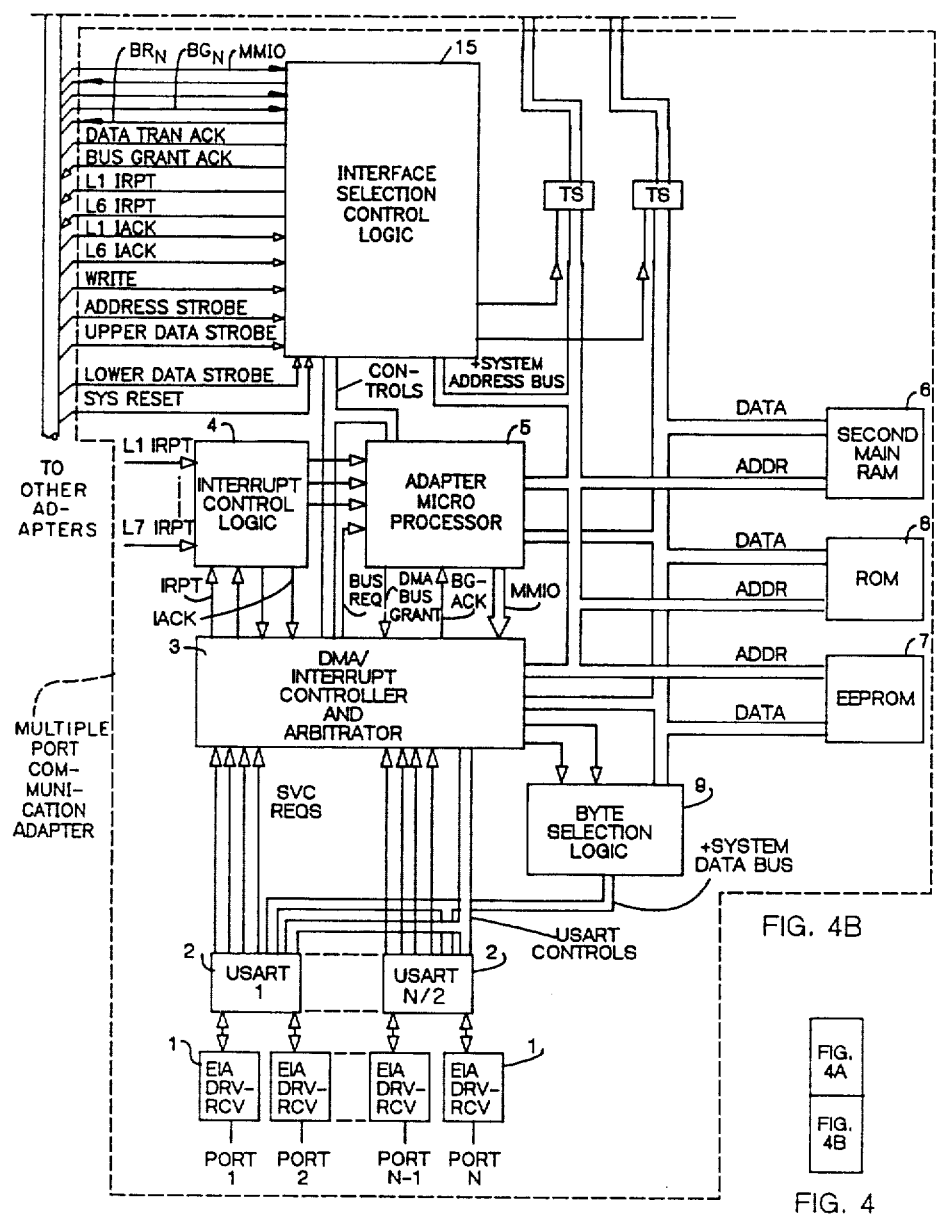

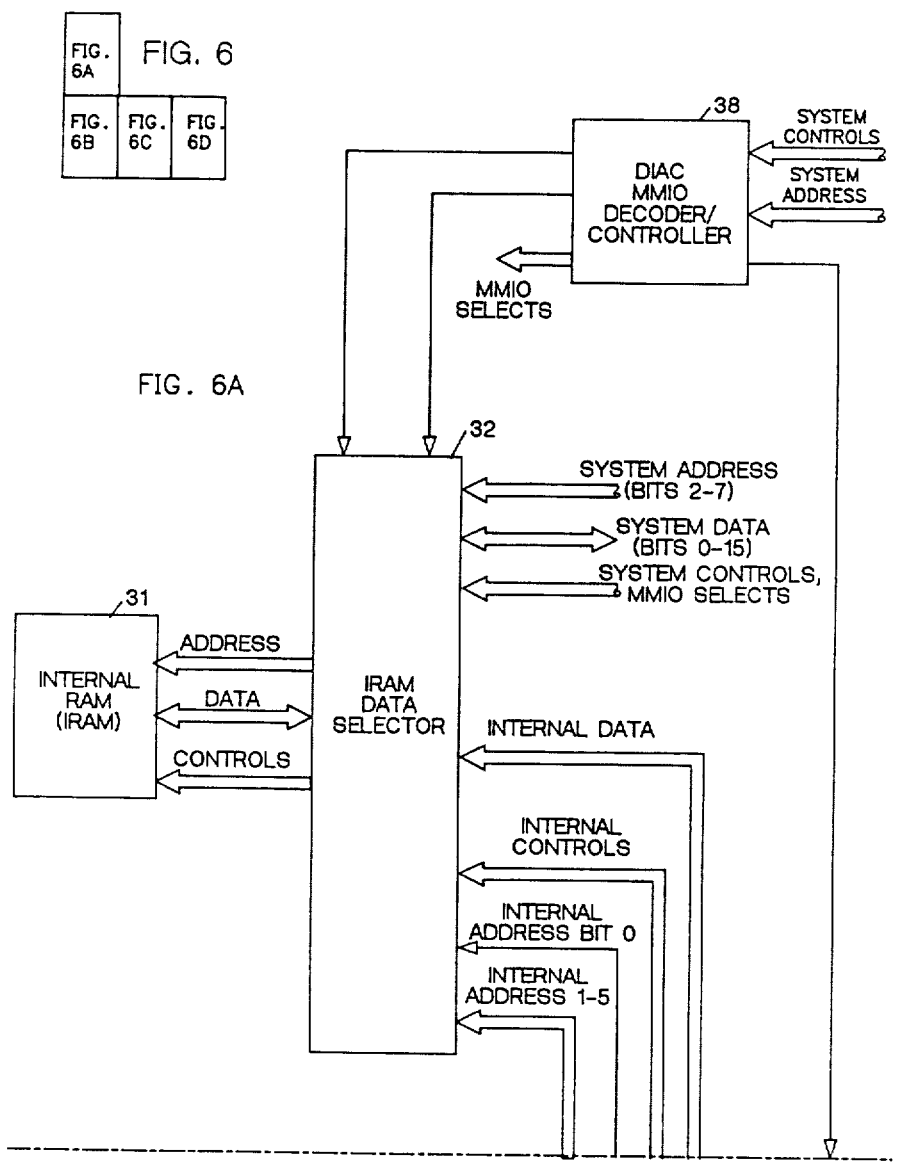

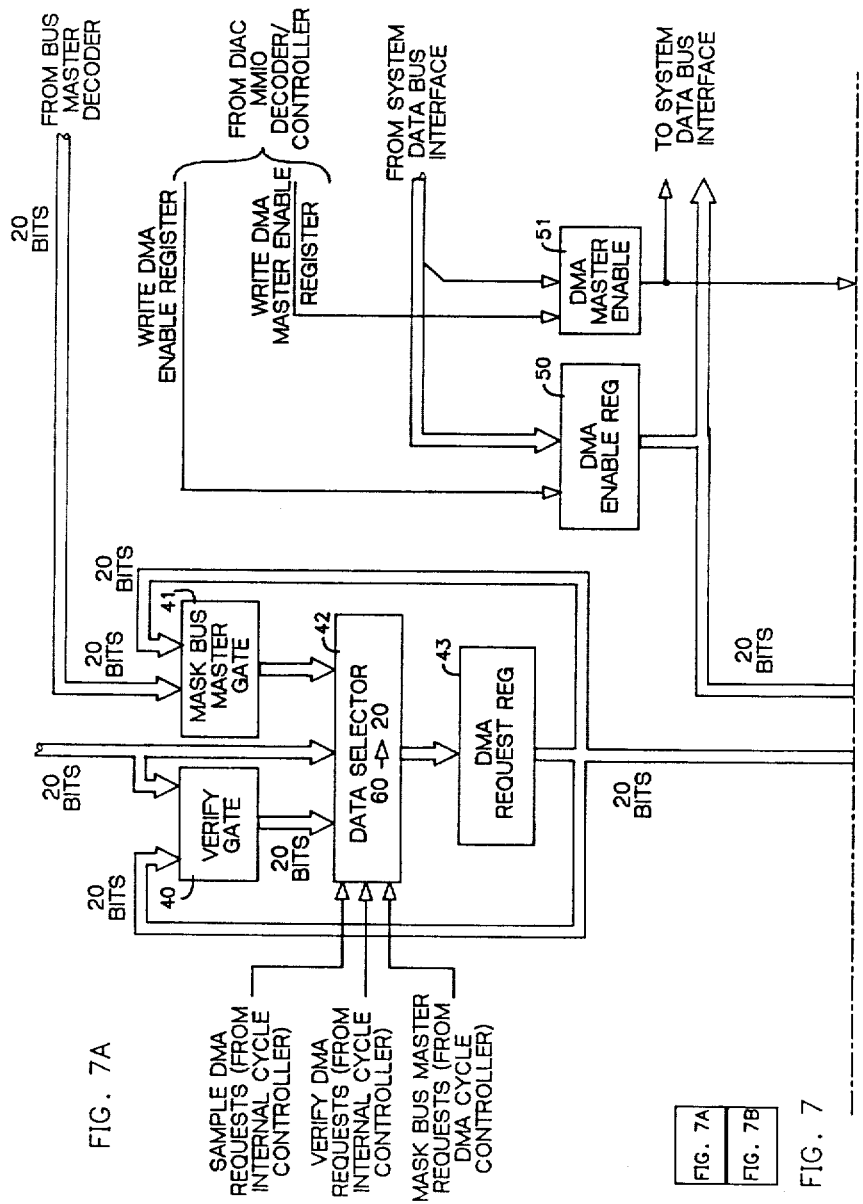

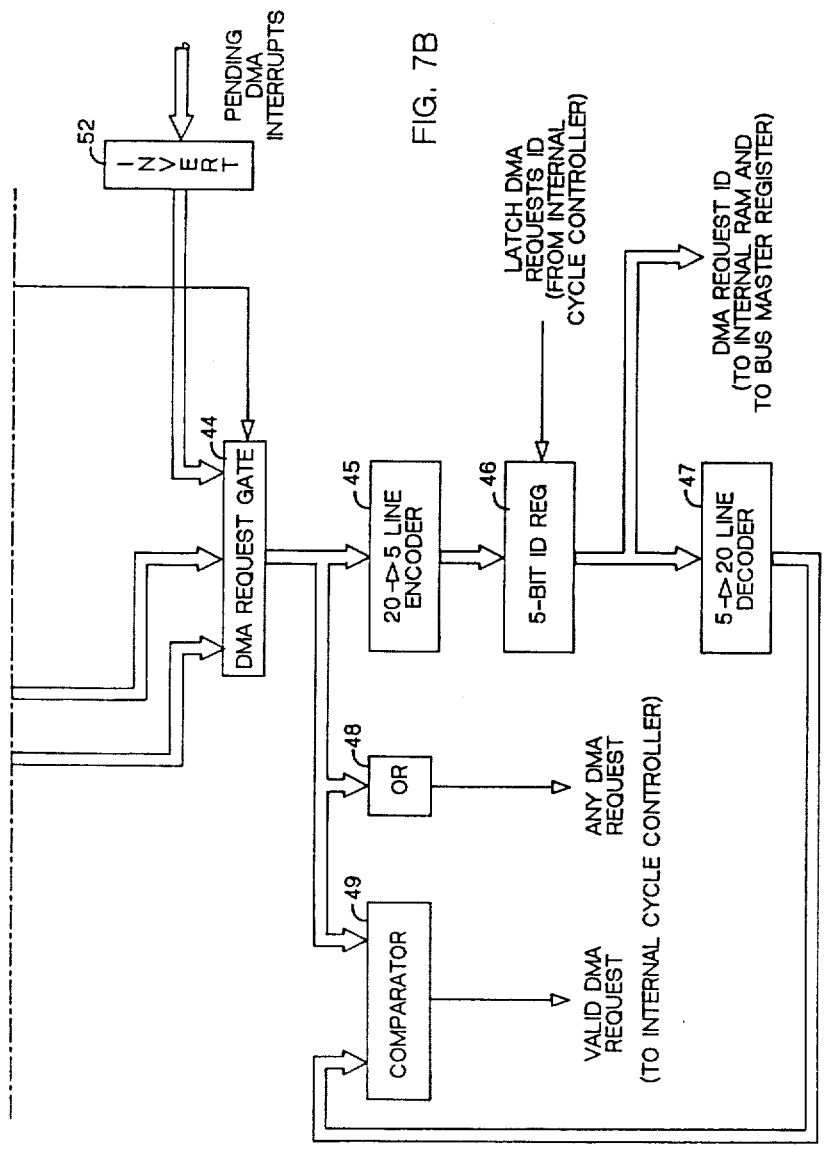

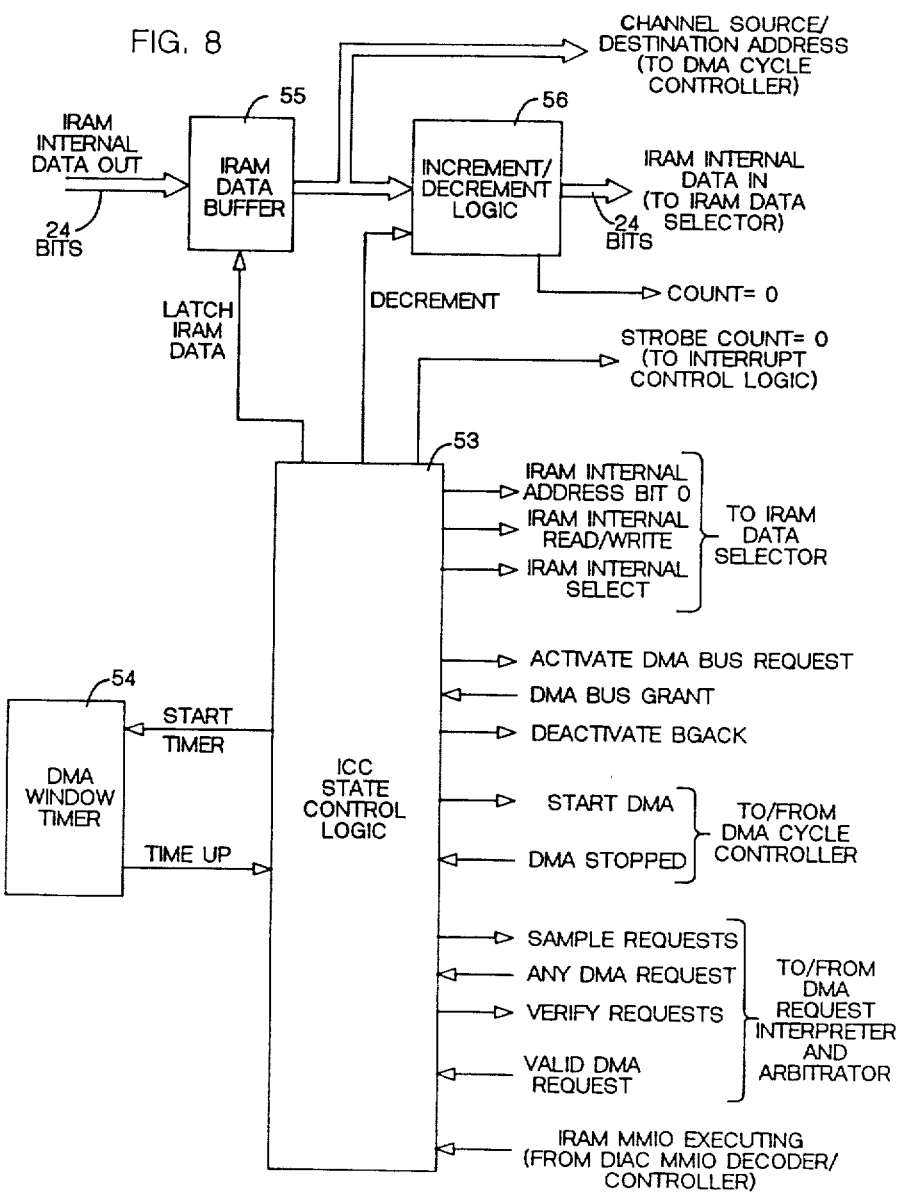

MULTIPLE PORT INTEGRATED DMA AND INTERRUPT CONTROLLER AND ARBITRATOR

FIELD OF THE INVENTION

This invention relates to direct memory access controllers and to character interrupt mode controllers in general as utilized in systems where there is a main processor and its associated main memory to which external devices require access. More specifically, the invention relates to an improved dual mode controller and arbitrator that can handle both DMA and interrupt mode operations individually for each of a plurality of communications channels.

PRIOR ART

In a system capable of receiving and transmitting data over communications lines, a primary hardware architectural consideration is the mechanism of data transfer employed between receivers and transmitters. Two common and distinct approaches are the character interrupt driven method and the direct memory access method of data transfer.

In the character interrupt driven method, a communications device (typically a universal synchronous asynchronous receiver transmitter or USART) will present an interrupt to the main processor when it is ready to transmit or receive a data character. The processor, after identifying the interrupting device, typically by the device presenting a unique interrupt vector, enters an interrupt servicing routine that eventually causes the processor to execute the data transfer for the USART. It is usually desirable to transfer data to or from a buffer region in the randomly accessible memory associated with the main processor. Therefore, if the interrupting device is a receiver, the main processor will access the received data and write it into the appropriate memory location. However, if the device is a transmitter, the main processor will access the appropriate memory location and transfer data to the transmitter. This mechanism is relatively simple in design but is very costly in terms of the number of processor cycles involved in accomplishing each given transfer.

The alternative mechanism commonly employed for data transfers is the direct memory access method. Generally, this method employs a specialized DMA controller or processor which executes the transfer by taking control of the required system busses from the main processor when it is not utilizing the memory and can relinquish control of the busses. The DMA controller then moves data between the receiver or the transmitter and the main system's memory. Entire blocks of data may be moved in this manner before interrupting the main processor to signal the end of the transfer or the request for a new transfer. Although this method is very efficient for handling communication channels where block data movement is prevalent, it adds a significant degree of complexity and inherent inflexibility in the overall system design that is not consistent with the requirements of slower speed character mode transfer operations such as start-stop protocol or slower speed telecommunication devices. These drawbacks become even more significant if a system is required to handle numerous channels in the DMA mode. While DMA controllers for plural channels are known, one of the most highly capable ones known today is the Motorola Corporation model 68450 that supports relatively few channels for direct memory access. Typically four channels are supported in these devices. In the present invention, it is necessary to support a great many more channels, perhaps 20 or more, and to do so on a single chip architecture.

OBJECTS OF THE INVENTION

In view of the foregoing known difficulties with the prior art approaches, it is an object of this invention to provide an improved dual mode data transfer controller for both direct memory access and interrupt driven access techniques that is useful for multiple ports.

A further object of the invention is to provide an improved dynamically adjustable or programmable dual mode data transfer controller capable of operating with numerous communication ports in individually tailored fashion to support one mode of operation for some ports and another mode of operation for still others.

Another object of the invention is to provide an improved DMA transfer controller architecture utilizing an internal dedicated random access memory but eliminating the effect of the time delay involved in accessing such a memory.

A further object is to provide an improved random access memory control employing a pipelined internal cycle controller architecture that allows DMA transfer to occur on an earlier processed request while preparatory stages of "housekeeping" are being conducted for queued requests, thus eliminating the time delay inherent in accessing the random access memory insofar as it affects the overall data throughput.

Yet another object of the invention is to provide a means for enhancing the probability that multiple DMA transfer requests will be present since multiple requests may be stacked and handled together on a single grant of bus usage from the main processor and system performance can be greatly improved by requiring only a single request to handle several DMA transfers.

SUMMARY

Since the optimum method of data transfer for a given channel will be dependent upon the type of communication intended for the channel, the present architecture and hardware are designed to be programmably selectable for the mode of data transfer either in the DMA mode or in the interrupt driven mode. The resultant architecture is incorporated into a single chip VLSI technology circuit. The architecture employs arbitration logic connected to receive the request from a plurality of communication channels for data transfer operations. The arbitrator is configured by programming to assign a mode of data transfer operation for each channel as selected by the system user. Arbitration among competing contemporaneous requests is provided by an arbitration means in the circuit and an appropriate DMA or character interrupt request is then given either to a DMA interrupt controller or a character interrupt controller, each of which resides separately in the architecture of this chip. Both a DMA mode processor for data transfers and an interrupt mode processor for data transfers together with a request arbitrator form the basis of the architecture. The DMA mode processor also utilizes an internal dedicated random access memory together with memory access selection and control logic and an internal cycle controller therefor utilizing a pipelined mode of operation in which accesses to the random access memory are ongoing while current DMA transfers from previous accesses are being serviced. This design eliminates the effect in data throughput reduction that normally occurs when designs employ random access memory as is well known to those of skill in the art.

These and other attributes of this unique design will now be described in greater detail with reference to a preferred embodiment thereof further described and set forth in the attached drawings in which:

BRIEF DESCRIPTION OF THE DRAWINGS

FIG. 4, comprising FIGS. 4A and 4B, illustrates the overall architectural layout of the improved protocol adapter and interface controller of the preferred embodiment of the invention with a modification thereof for attachment to a scannerless communications controller as shown in the commonly assigned co-pending patent application Ser. No. for creating an overall combined communications controller and programmable protocol adapter/port controller configuration of a preferred embodiment of the invention.

FIG. 6, comprising FIGS. 6A, 6B, 6C and 6D, illustrates a detailed logic diagram and architectural data flow and control interconnection diagram for the DMA/interrupt controller and arbitrator included as element 3 in FIG. 1.

FIG. 7, comprising FIGS. 7A and 7B, illustrates a portion of FIG. 6 in detail, specifically that portion of FIG. 6 contained within the block number 30 as a preferred embodiment thereof.

FIG. 8 illustrates in greater detail a portion of the diagram in FIG. 6, specifically that portion labeled as the internal cycle controller block 33 in FIG. 6.

DETAILED SPECIFICATION

Figures 1, 1A, 1B:
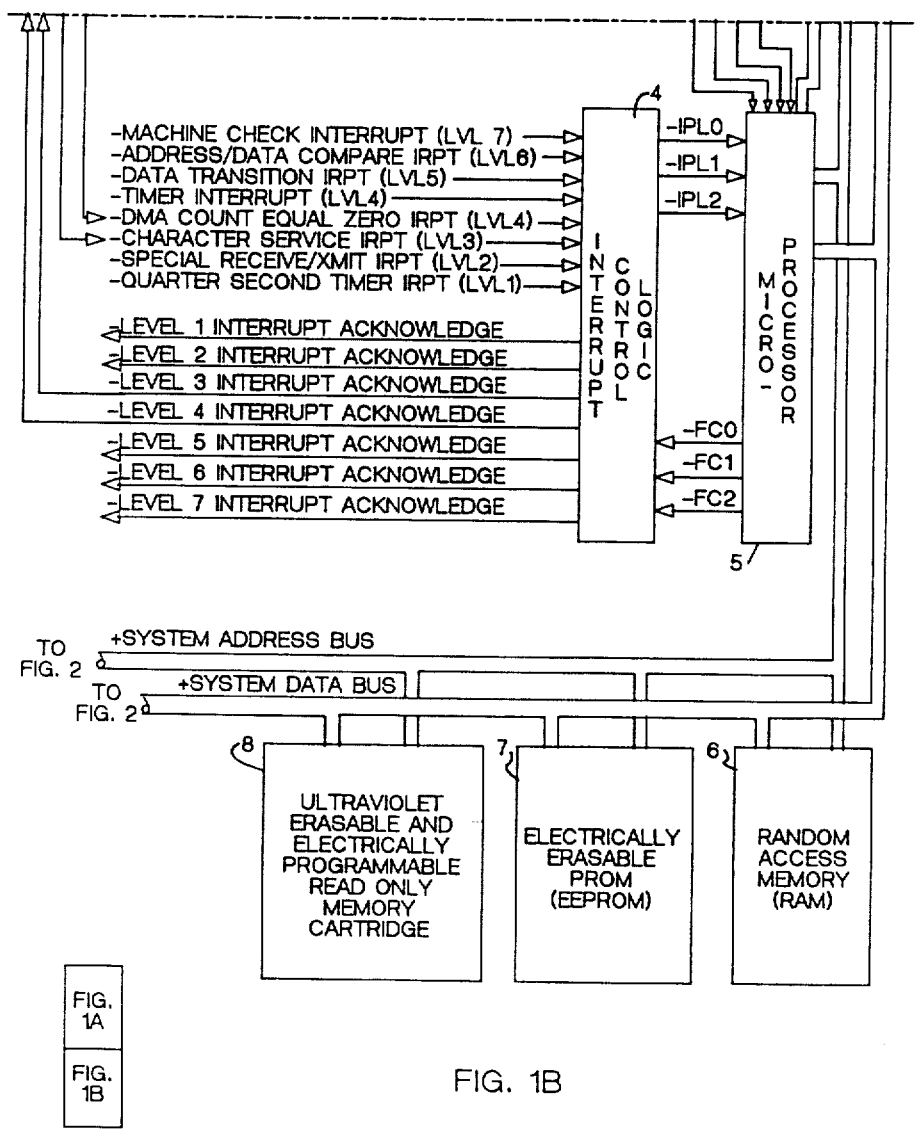
FIG. 1, comprising
FIGS. 1A and 1B, illustrates the architectural layout of the components and the interconnecting control and data paths in a preferred embodiment of the invention.

The present design is a microprocessor based machine and can be assigned a variety of programmably controlled tasks such as protocol conversion, data blocking, error handling and recovery and systems communication control functions to name but a few. The overall configuration to be described is that of a programmably adjustable protocol adapter and port interface communications controller. It incorporates in addition to its own novel architecture and data flow and control, a novel DMA/interrupt controller and arbitrator that will be separately described herein. In addition, the protocol adapter and interface communications controller can be provided with interface control logic to act as a communications adapter for connection to the scannerless communications controller of the commonly assigned co-pending application Ser. No. 06/744,851 filed 6/14/85 to create an overall protocol adapter having bus access to the scannerless communications adapter for concentration of messages on a high speed link from the scannerless controller to a host. This novel arrangement and its architecture is also described.

Overview of Programmably Adjustable Protocol Adapter and Port Interface Communications Controller An interface for DMA and interrupt requests on ten ports, each comprising a transmit channel and a receive channel is provided for a total of twenty channels with separate arbitration of transmit or receive DMA and interrupt requests for each port therein. In addition, DMA/interrupt control is provided for the same ten ports and twenty channels either in receive or transmit mode. The mode of character service for each channel can also be selected under program control. This can via direct memory access with the received or transmitted character moved from a receiving/transmitting USART receiving buffer to or from random access memory contained in the programmably adjustable protocol adapter and port interface communication controller without interrupting the processor contained therein. In the alternative, the received or transmitted character can be moved via DMA with an interrupt presented to the processor. As a further alternative, DMA may not be used and instead an interrupt is presented to the processor which calls an interrupt service routine for directing the processor to service the given receiving USART or transmitting USART with a memory mapped I/O operation for reading or writing the USART buffer.

The flexibility provided by the architecture and design of the controller allows a programmer to customize the operation for each communications channel to obtain maximum hardware performance. For example, if a given port is to be driven in start-stop protocol mode, the programmer may choose to operate that given port in the receive mode in which the controller's processor is interrupted when each character is received. However, the transmit channel for the same port could be programmed to operate in DMA mode and start-stop protocol. This allows the program in the processor to examine each received character for validity, correctness, parity, etc., but to directly transmit already correct outbound messages without interrupting the processor until the complete message has been transmitted.

As another example, an SDLC protocol port could be serviced in the DMA mode for both receive and transmit channels since higher speed block transfers are used for both channels in this protocol.

In general, the means of data transfer, i.e., the protocol and the memory access method over any of the twenty channels can be individually selected by programmed instruction to be either memory mapped I/O character service interrupt mode or direct memory access mode. If direct memory access is selected, the program may also select whether or not interruption for each character transferred via DMA should be presented to the processor. The DMA operations are controlled by the DMA/interrupt controller and arbitrator that directs the transfer of one character at a time from a USART (universal synchronous asynchronous receiver transmitter) to random access memory or from memory to the USART.

Assuming DMA mode of operation is invoked, when the USART receives a character in its receive buffer, it will activate a DMA receive request and it will activate a transmit DMA request when the transmit buffer is empty. DMA requests are handled by the DMA/interrupt controller and arbitrator (DIAC) as either DMA requests, interrupt requests or as both DMA and interrupt requests, depending upon how the program configures the DMA/interrupt controller and arbitrator (DIAC).

Thus, each communication port receive channel and transmit channel can be configured to operate using DMA data transfers or using interrupt mode transfers to signal the processor to transfer another character or block of characters via memory mapped I/O command execution.

If a given channel is operated in a DMA mode, the program will be configured to set up a starting address and a byte count for that channel. The DIAC will then signal the processor via an interrupt when the receive byte count becomes zero or when the transmit byte count becomes zero. Upon receipt of the end of file character for a message, an upstream USART will signal the processor via an interrupt that transmission or reception of a message is complete. When an entire block of data has been assembled from a downstream USART, the DMA controller will be notified by the processor and will start the upstream transmission from a processor-specified buffer address in random memory. The DMA interrupt controller and arbitrator is set up by MMI/O operations from the processor.

Overall Data Flow Initialization

Turning to FIG. 1, the following description is given for a controller handling requests for service from up to twenty channels comprising ten receive and ten transmit channels. FIG. 1 is illustrative and will be referred to. The DIAC controller 3 handles requests for service from each of up to twenty transmit/receive channels represented in FIG. 1 by the port 1 where the EIA driver receiver circuits are located. There is a receive channel and a transmit channel for each of the ten ports 1 as identified by the driver receiver pairs labeled port 1, port 2, etc. A number of USARTs (universal synchronous asynchronous receiver transmitters) 2 are connected to the EIA driver receivers at the ports 1. Each USART 2 handles two ports 1 and is therefor able to handle two driver receiver pairs. The DIAC controller 3 has a 24-bit address register and a 16-bit byte count register for each of the twenty channels as will be described in greater detail below. The registers are implemented in local random access memory contained within the DIAC module 3 as will also be described.

Each channel can be selectively operated by the control program in either DMA mode or character service interrupt mode. In the DMA mode, the transfer of a character between a given USART 2 and the main RAM 6 is under control of the DIAC controller 3. In the character service mode, the transfer of a character between a USART and main RAM 6 is controlled by the processor 5. Processor 5 may take any of a variety of forms, but in the preferred embodiment, a Motorola MC 68000 microprocessor was employed and will be used for demonstration purposes herein.

Initialization begins with a system reset function after which the control program operating in the microprocessor 5 is utilized for initializing each channel operation for either the DMA mode or the character service interrupt mode according to the choice of the programmer. For each channel that is to be configured to operate in DMA mode, a control program must be encoded for setting up that channel's address register to a starting address and to provide a byte count in that channel's byte count register. These registers, as noted above, are part of the DIAC controller 3's local random access memory that is contained within the DIAC 3 and will be described in greater detail later.

When a given channel's byte count register is decremented to 0 in the receive or transmit operation, a level 4 interrupt will be generated by the DIAC controller 3 as shown by the level 4 interrupt line in FIG. 1. The processor 5 will then perform the level 4 interrupt acknowledge cycle and cause the interrupt control logic 4 to issue the level 4 interrupt acknowledge signal. At the same time, the DIAC controller 3 will place the unique vector number on the system data bus in response to the interrupt acknowledge signal to identify the particular channel whose byte count has been decremented to 0. This allows the control program in the microprocessor 5 to service a particular channel based on the vector number generated by the DIAC controller 3. Since the vector numbers identify starting addresses in the main RAM 6, a variety of pre-programmed control and service routines can be selectably provided for any given type of channel operation at each port. This greatly facilitates protocol conversion, for example, from start-stop or SDLC to bisync, (binary synchronous) or start-stop and vice versa by choice of the appropriate processing routine for in-bound or out-bound characters.

Channels operating in the character service interrupt mode will cause a level 3 interrupt to be generated by the DIAC controller 3 each time the USART 2 requires character service for that particular channel. The processor 5 will then perform the level 3 interrupt acknowledge cycle and cause the interrupt control logic 4 to issue the level 3 interrupt acknowledge signal. In response thereto, the DIAC controller 3 will place a unique vector number on the system data bus to identify the particular channel where character service is then required. This will allow the control program in the processor 5 to service that channel based on the vector number generated by the DIAC controller 3.

Receive Operation Data Flow

As depicted in FIG. 1, an EIA receiver and driver pair 1 exists for each port. This circuitry receives data signals either from modems or from directly attached terminals using start-stop communication lines or the like and converts the data from EIA RS-232C voltage levels to TTL voltage levels. The USART module 2 receives the serial data and accumulates an 8-bit byte of data. The USART 2 then activates its request line for the given receive channel to indicate to the DIAC controller 3 that a byte of data is ready. The DIAC controller 3 has been previously programmed in this assumption to handle a request as a DMA request or it might have been previously programmed to handle the request as a character service interrupt request.

We will consider first the case where the DIAC controller 3 was programmed to handle a given channel's incoming request as a DMA request. Arbitration logic contained in the DIAC controller 3 will receive requests for up to twenty channels. If any channel has an active request for a DMA data transfer, the DIAC will activate the DMA bus request signal to the processor 5. Processor 5 activates the DMA grant signal and the DIAC 3 will respond with the DMA bus grant acknowledge signal which indicates that the DIAC is the bus master and will cause the microprocessor 5 to be held from placing any data on the system busses. The DMA bus grant acknowledge signal supplied by the DIAC is provided whenever the strobes from the previous machine cycle go inactive during an active bus grant.

If a given USART 2 has a receive request which is deemed to be the highest priority request, then the DIAC will be configured to handle that USART 2's receive data transfer as follows. The DIAC controller will first fetch the DMA address from its locally contained random access memory. This is the address of a starting location in the main RAM 6 where the USART 2's receive character data is to be stored. The DIAC will activate the system address bus with this address. The DIAC will condition the byte selection logic 9 in such a fashion that the USART's 1 byte wide data bus is connected to the system's high byte bus if the address is even, or to the system's low byte address bus if the address is odd. Since data is to be moved from the USART 2 to the main RAM 6, the direction control for the byte selection logic circuit 9 is set to drive data from the USART 2 to the RAM 6. The DIAC will then perform a read operation to the USART 2 which causes the USART to drive the contents of its buffer onto the data bus as the received byte of data. The DIAC will then perform a write cycle to the main RAM 6 which causes the data from USART 2 to be written into the RAM 6 at the selected address previously provided. The DIAC will then increment the DMA address stored in its internal RAM and will decrement the DMA byte count stored therein for that channel. These address and byte count fields are located in the DIAC's internal RAM in a section assigned as a control block for a given channel as will be discussed in greater detail later. When the transfer of the data from the USART 2 to the RAM 6 is complete, the DIAC controller deactivates the DMA bus grant acknowledge signal to the microprocessor 5. The arbitration logic in the DIAC will continue to monitor request lines from the USARTs 2.

It will be noted that it has been assumed that the USART being handled had the highest priority request pending. The means of deciding priority will also be described in greater detail below, but, briefly, it is based upon the physical location of the connection to the DIAC controller 3 with highest priority being accorded to the highest number request line having a request present.

The next case considered is that in which the DIAC was programmed to handle the given USART's receive request for that channel as a character service interrupt request. The interrupt arbitration logic contained in the DIAC 3 receives requests for up to 20 channels which might be programmed as interrupt requests. If any channel has an active interrupt request, the DIAC activates the level 3 interrupt request signal to the interrupt control logic 4. When the level 3 interrupt request becomes the highest active level interrupt to the processor 5, the microprocessor 5 will perform an interrupt acknowledge cycle for a level 3 interrupt. The level 3 interrupt acknowledge signal will be issued by the interrupt control logic 4 and supplied to the DIAC 3. The DIAC will then place a vector number on the system data bus which gives a direct indication of the highest priority interrupting channel. The control program operating in the processor 5 will then be directed to the start location in main RAM 6, EPROM 8 or EEPROM 7 wherever the code resides for handling that USART's character service request. The processor 5 will then perform a read operation to the USART 2 and will read the data byte from the USART's buffer. Processor 5 will then store this data byte in the main RAM 6.

Having described briefly the data flow in a receive operation, the data flow during a transmit operation will now be given.

Transmit Operation Data Flow

When a given USART 2's transmit buffer is empty, the USART 2 will activate its request line for a transmit operation for the channel involved. The DIAC 3 was previously programmed in this assumption to handle the request as a DMA request or it may have been programmed to handle the request as a character service interrupt request.

Considering first the case where the DIAC was programmed to handle the channel request as a DMA variety, the arbitration logic contained in the DIAC will receive requests for up to twenty channels and select that channel having the highest priority. If any channel has an active request for a DMA transfer, the DIAC will activate the DMA bus request signal to the processor 5. The processor 5 will activate the DMA bus grant signal back to the DIAC 3 and the DIAC 3 will respond with the DMA bus grant acknowledge signal when the strobe periods from the previous machine cycle of processor 5 go inactive. Activation of the DMA bus grant acknowledge signal by the DIAC indicates that the DIAC is bus master and causes processor 5 to be held from presenting data to the system busses.

If the given USART 2's transmit request happens to have the highest priority then pending, the DIAC will be configured for handling that USART's transmit data transfer operation. The DIAC controller will fetch the DMA address from its local random access memory and will activate the system address bus with this address. The DMA address is that address in main RAM 6 where the USART 2's transmitted character or data is to be fetched. The DIAC controller will also activate the byte selection logic 9 such that the given USART 2's one byte data bus will be connected to the system's high byte if the address presented is even or to the system's low byte if the address is odd. Since data is being moved from the main RAM 6 to the USART 2, the direction control for the byte selection logic 9 is set for driving data from the RAM 6 to the USART 2. The DIAC will then perform a read operation to main RAM 6 which causes it to drive the USART 2's data bus with the one byte of data for transmission. The DIAC will then perform a write cycle to the USART 2 which causes data from the RAM 6 to be written into the USART 2's buffer. The DIAC will then increment the DMA address and decrement the DMA byte count for that channel and store the control information in the control block for the channel located in the DIAC's internal RAM. When the transfer of the data from main RAM 6 to the USART 2 has been completed, the DIAC will deactivate the DMA bus grant acknowledge signal to the processor 5. The arbitration logic contained in the DIAC will continue to monitor the request lines from other USARTs including the one just serviced.

Next, the case will be considered in which the DIAC was programmed to handle the given USART 2's transmit channel request as a character service interrupt request. The interrupt arbitration logic in the DIAC will receive requests for up to twenty channels which might be programmed as interrupt requests. If any channel has an active interrupt request, the DIAC 3 will activate a level 3 interrupt request signal to the interrupt control logic 4. When the level 3 interrupt request becomes the highest active level interrupt presented to the processor 5, the processor 5 will perform an interrupt acknowledge cycle for level 3. The level 3 interrupt acknowledge signal will then be activated by the interrupt control logic 4 and presented to the DIAC 3. The DIAC controller will place a vector number on the system data bus to give it direct indication of the highest priority interrupting channel. The control program operating in the microprocessor 5 will then go directly to the location in storage specified by the address on the bus to access the code that handles that USART 2's character service request. The microprocessor 5 will perform a read operation in the main RAM 6 to obtain the data byte from RAM. The processor 5 will then perform a write operation to transfer the data byte to the USART 2's transmit buffer.

The foregoing description is the broadest and most general for the overall data flow and architecture for a programmably adjustable protocol adapter and port interface communications controller illustrated in FIG. 1 as a preferred embodiment of the invention. It may be observed that the particular communication conventions or protocols employed at each port are determined by which code routine in the storage such as EPROM 8 is accessed in response to a request from a given port. It is the control program operating in the microprocessor 5 that makes the selection based upon choices made by the system programmer from a menu or other suitable presentation means when the configuration is assigned for each channel. Conversion from one protocol to another is handled similarly by calling from EPROM 8 or RAM 6 the appropriate sequences of code for generating headers, converting byte formats, generating SDLC control and flag fields, binary synchronous control characters and start-stop control characters and for presenting them in the proper order to accommodate the transmission or reception at any of the ports according to the assigned protocol for the port. Therefor, the architectural structure of the invention permits a great latitude of flexibility and choice in assigning a specific type of character service and port protocol to each channel. This can be different for the transmit and receive channel at each port as has been earlier indicated. This provides an even greater degree of flexibility for the reasons noted and hence, the architecture truly serves as a universally adjustable protocol adapter and port interface communications controller.

Figure 2:
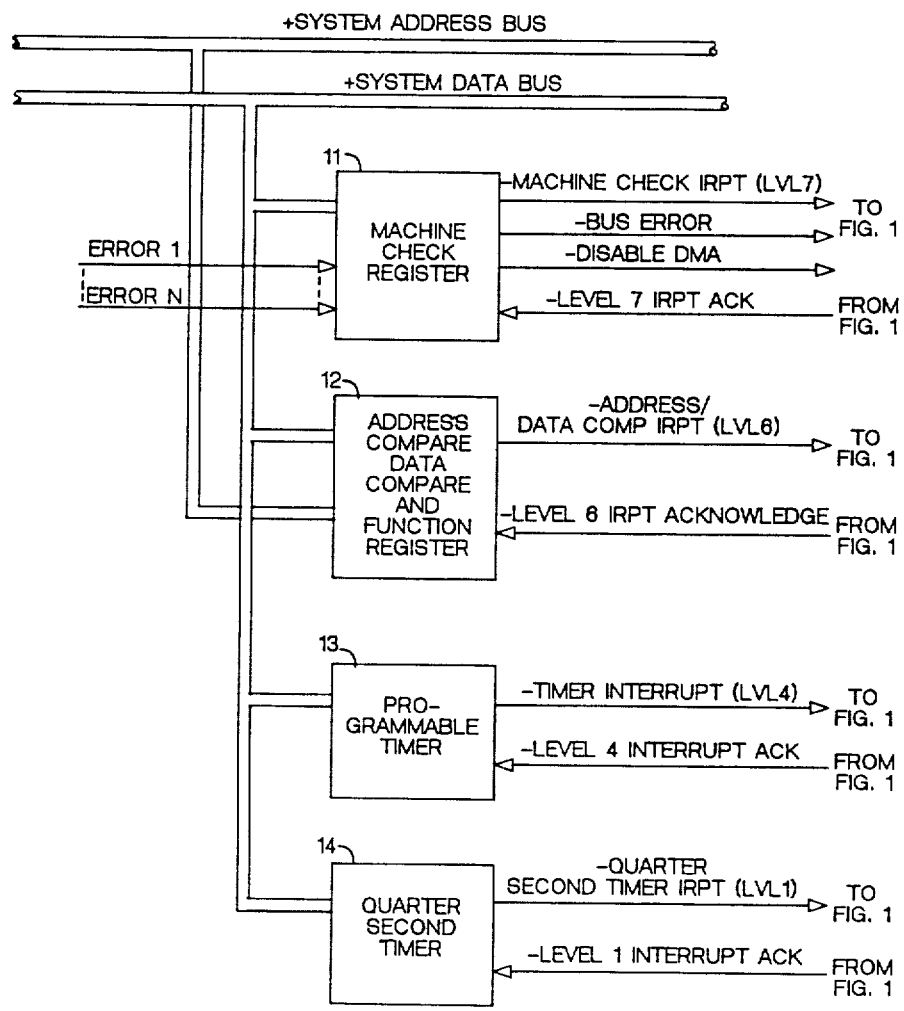
FIG. 2 illustrates certain machine logic control registers, timers and the address and data comparison registers which are a portion of the apparatus in FIG. 1 and which are connected via the signal lines and system busses to the elements in FIG. 1 as shown.

Turning to FIG. 2, additional data flow controls which form a portion of the system depicted in FIG. 1 as shown by interconnections thereto, are illustrated. A machine check register 11 is supplied with bit error lines 1 through 6 which come from various sources as will be described. Machine check register 11 will present a machine check interrupt on level 7 or a bus error interrupt to the interrupt control logic 4 in FIG. 1. A level 7 interrupt acknowledge signal from the interrupt control logic 4 in FIG. 1 will be returned. The machine check register 11 is connected to the system data bus and operates as described below under the continued description of FIG. 2.

The address/data compare and function register 12 is also connected to the system data bus and generates an address/data compare interrupt on level 6 for presentation to the interrupt control logic 4 in FIG. 1 and which receives therefrom an interrupt acknowledge signal on level 6. Address and data compare functions which can be set up by the programmer for program debug are detected and indicated via this interrupt level.

A programmable timer 13 is connected to the system data bus and may be written with timing parameters to periodically provide a timing interrupt on level 4. The programmable timer contains a counter which is loaded with a starting count and which is decremented at a fixed rate by an internal oscillator. Comparison circuitry detects when the count is decremented to 0 and provides an interrupt on level 4 in a periodic manner based upon the magnitude of the starting count and the rate of decrementation as is apparent to those of skill in the art. A fixed quarter second timer 14 is useful for presenting quarter second timeout interrupt on level 1. The programmable timer is used to measure the transition to transition times at a given channel as a measure of the line speed as will later be described in greater detail.

The machine check register 11, the address and data comparison function registers 12 and the programmable timer and fixed increment timer 13 and 14 respectively are commonly employed elements in a microprocessor-based system and are not described in great detail herein for that reason.

Description of Basic Building Blocks

The programmably adjustable protocol adapter and port interface communications controller has been designed to use commercially available components wherever possible. The listing to be given now is not a limitation since many vendors provide similar equivalent devices. In the preferred embodiment shown in the drawings, the microprocessor 5 is a Motorola Corporation 68000 microprocessor. The system control logic and interrupt control logic 4 are a high density VLSI circuit technology whose functions will be described in greater detail later.

The USARTs 2 are Advanced Micro Device's 8530 dual port communications controller modules and, as their name suggests, are each capable of handling two EIA driver receiver ports.

The electrically erasable and programmable memory (EEPROM) is commercially available 8K by 8 modules.

The electrically programmable read only memory (EPROM) is a vendor supplied 32K by 8 ultra violet light erasable programmable read only memory.

The dynamic RAM 6 is vendor supplied 64K by 1 and 64K by 4 modules. The EIA RS232C interface driver and receivers are available from a variety of vendors and EIA RS422 interface driver and receivers may also be employed.

The foregoing building blocks provide a data path from an end user equipment attachable via direct link or modems to the EIA driver receiver ports 1 to a host computer that may be attached over another of the ports 1.

As noted earlier, the communication ports 1 can be configured for operation as SDLC protocol, ASCII protocol, binary synchronous protocol or start-stop protocol or any other suitable protocol and can operate up to a maximum speed of 19,200 bps. Internal clocking, modem clocking or data derived clocking are all supported by the modules provided. The maximum line speed is determined by the capability of the EIA driver receivers 1.

A planar circuit board is used to house the microprocessor, the control logic, the USART's and the dynamic RAM modules and the EEPROM. The UV erasable EPROMS are contained in a customer pluggable cartridge as will be described in greater detail below. While it is not shown in the figures, a power supply for supplying the appropriate logic level voltages and read and write voltages is also contained in the circuit board. The architecture of the system provides functions for maintaining system availability, error detection, error isolation, and error recovery which will now be discussed.

Microprocessor 5

The Motorola MC 68000 microprocessor is an 8 megahertz clocked 16-bit bidirectional data bus and 23-bit address bus machine. Upper data strobe and lower data strobe signals provide memory addressing ranges of more than 16 megabytes. Microprocessor 5 provides eight 32-bit data registers, seven 32-bit address registers, a user stack pointer, a supervisory stack pointer, a 32-bit program counter and a 16-bit status register. The data registers are used for 8-bit byte, 16-bit word and 32-bit long word data operations. The address registers and the system stack pointer may be used as software stack pointers and base address registers. The registers may be used for word and long word address operations as well. All of the registers may be used as index registers. Complete descriptions of the MC 68,000 can be obtained from the vendor.

System Control Logic

The system control logic performs all the functions required for tieing the subsystems and modules together to provide interfaces to the microprocessor 5, the EPROM modules 8, the EEPROM module 7 and the dynamic RAM modules 6 and the USARTs 2.

The system logic includes functions of: clock generation for the C and B clocks used in the logic, a processor cycle clock and a USART clock. A quarter second timer is also included which provides an interrupt to the microprocessor interrupt control logic approximately every ¼ second whenever enabled. If the timer interrupts are not acknowledged within two seconds, a machine check level 7 interrupt will be set. The microprocessor program execution will utilize the ¼ second timer as an elapsed time indicator having a period of 284.4 milliseconds and a resolution of 8.68 microseconds.

A programmable timer is also included and can be programmed to provide an interrupt to the interrupt control logic at a selected time after the program enables the timer. The program operating in the microprocessor 5 can read 16 bits from this timer.

The system initialization logic consists of reset control logic circuits, system initialization latch, a machine not ready latch, the EPROM basic assurance test latch and an interface enable latch. The interrupt control logic in block 4 includes an interrupt level encoder, interrupt acknowledge decoder and an interrupt inhibit latch and is, like the system initialization logic, the programmable timer and the ¼ second timer and the clock generation circuits, of a standard design widely available from a variety of sources. All of these are standard design and are thus not shown in detail, it being obvious to those skilled in this art as to how to use such elements.

A bus error and machine check register is also employed in the system control logic as are the following: parity generation and checking, the DIAC chip itself 3, the dynamic RAM interface logic, the EPROM interface logic and the EEPROM interface logic, memory mapped I/O controls, USART 2 interface controls, operator panel control logic and address and data compare registers. Of these, the parity generation and checking, the memory interface logic, the MMI/O controls and the USART interface controls and the operator panel logic are all standard and are primarily dictated by the logic levels and pin designations of the commercially available modules used for constructing the system. The DIAC chip, however, is unique and will be discussed in great detail below. The functions of the address and data compare registers as shown in FIG. 2 with the machine check register 11, the address and data compare register 12, the programmable timer 13 and the ¼ second timer 14 will all be discussed now.

The basic clocks for the system in the clock generation logic not shown in the drawing consists of a quartz controlled 14.7456 megahertz oscillator which is divided down by counters to a 7.3728 megahertz rate to provide the basic clock for the Motorola 68,000 microprocessor 5. The logic system control clocks are generated at the same rate and at a counted down rate of 3.6864 megahertz to provide the C and B logic clocks used to control the operation of latches within the system logic. The C and B clocks are non-overlapping and are used to clock various latches in the logic circuits. The B clock is used to latch registers as usually associated with the clocking of the output signals from the logic. The C clock latches the input to shift register latches and is generally associated with clocking of input byte signals to the logic circuits. The 3.6864 megahertz clock is generated for clocking the USARTs also.

System timers. The ¼ second timer is enabled or disenabled by an MMI/O instruction from the microprocessor 5. The timer will interrupt on level 1 to the interrupt control logic 4 when it has timed out. The initial timing interrupt in all subsequent interrupts will be relative to the time that the timer was first enabled. The initial interrupt will occur approximately a ¼ second after the timer is enabled and subsequent interrupts will occur a ¼ second apart as long as the timer is enabled. The system is designed such that if an interrupt is not acknowledged within two seconds, a level 7 machine check interrupt will be sent in the interrupt control logic block 4. A microprocessor control program is designed to read bits 5 through 20 of a counter in the timer circuit with an MMI/O instruction. Bits 5 through 20 of this count are placed on a system data bus as bits 0 through 15 whenever the timer is read with the MMI/O instruction.

In FIG. 2 the ¼ second timer 14 is shown only as a logic block since the details of an oscillator driven counter and the necessary interface latches and controls for reading an MMI/O instruction and placing data on the data bus are all ordinary skill in the art.

The programmable timer 13 is of a similar design except that the counting modulus may be programmably set by a control program operating in the microprocessor 5. The control program can read 16 bits of this timer as well by supplying an MMI/O instruction and causing 16 bits to be placed on the system data bus from the programmable timer 13.

The following is a brief description of the overall system initialization. Reference will be made to various latches and registers and it will be understood by those of skill in the art that these are standard design and it is unnecessary to illustrate them in the drawing since their function and connection to the various components is completely standard and well understood.

Initialization of the system begins with a power-on reset that causes the microprocessor 5 to begin access to the dynamic RAM 6 or EPROM 8 at a fixed location for executing the basic assurance test program to bring the system to operation in step by step sequence. A system reset occurs first and then all DMA requests, interrupt requests, register contents and USARTs are de-gated until the program has enabled each interface.

A power-on reset begins the process. The control logic will activate a reset and halt signal to the microprocessor 5, holding it off for at least 100 milliseconds. The power supply itself provides the POR signal for at least 100 milliseconds. The control logic will activate a system reset signal for at least 100 milliseconds during the power-on reset.

The customer pluggable EPROM cartridge referred to earlier may not be plugged in when the power is turned on and if not, the machine will be held in its reset state until such a cartridge is inserted as will be described later. If the cartridge is removed when the power is on, the machine will be reset and held reset until the cartridge is re-inserted.

The power-on reset from the power supply also provides a short reset signal to the dynamic RAM control logic which allows the RAM to start refresh operations while the longer power-on reset is still active. The short reset signal will be at least 500 nanoseconds long and is referred to in the art as the DRAM control reset. The source of the reset latch for the RAM 6 is the system control logic which will implement a latch set when a power-on reset occurs. It will be reset when the machine is "not ready" which is set by the basic assurance test program.

Bit 7 of the status register included in the machine check register block 11 in FIG. 2 indicates this condition. A "machine not ready" latch is also implemented, but is not shown, for indicating that the machine is not ready for operation. The use of this latch indicates the machine is in the basic assurance test mode. It is turned on by the power-on reset signal, the system reset MMI/O signal or a specific MMI/O instruction to turn it on. The basic assurance test program will reset the latch with an MMI/O instruction as the last operation in the basic assurance test.

An EPROM basic assurance test latch is also implemented in the logic and not shown. This latch is set by the power-on reset signal and reset by MMI/O for system reset or by the MMI/O instruction for turning on the EPROM basic assurance test latch. It may also be reset with an MMI/O instruction. The basic assurance test program operating in the microprocessor 5 will reset this latch when the operation of the pluggable EPROM cartridge has been verified.

System initialization latch. A system initialization latch is also implemented and not shown in the drawing. Whenever the machine is reset by the power-on reset from the power supply or by an MMI/O from the processor 5, the processor will begin access to its first address beginning at hex 000000. There is a mapped starting address corresponding to hex 00000 that is the place in the EPROM 8 where the first instruction for system initialization exists.

Interrupt control logic. The interrupt control logic shown in block 4 in FIG. 1 implements an interrupt inhibit latch which is not specifically shown. Whenever a bus error occurs, this latch is set by a signal supplied by the machine check register 11 in FIG. 2 and connected as shown to the DIAC controller 3, the microprocessor 5 and a level 7 interrupt to the interrupt control logic 4. Setting of the interrupt inhibit latch blocks interrupts from occurring to the microprocessor 5 after a bus error has been detected. This is necessary because the Motorola 68000 implements bus error processing on an interrupt level that was active when the error occurs. Without the interrupt inhibit latch function, a higher level interrupt could interrupt the bus error exception processing. When the interrupt has been handled, the interrupt inhibit latch is reset by the exception processing code in the Motorola 68000 before presentation of any new interrupts is allowed.

The interrupt level. The interrupt levels are as follows: Bus error—the bus error is the highest level interrupt and is activated to the microprocessor 5 instead of data transfer acknowledge if a parity error or a data transfer acknowledge timeout occurs while the processor is the bus master. An error bit is set in the bus error machine check register 11 and the error signal is activated to the DIAC 3 as shown. This error signal disables the DMA MMI/O interface from block 3 such that a bus request will not be presented to the microprocessor 5 until the bus error machine check register 11 is reset to 0. The error exception processing in the microprocessor will thus occur at whatever level was active when the bus error occurred. The control logic 4 blocks any interrupts from occurring after the occurrence of a bus error and the interrupt inhibit latch must be again reset by the exception processing code routine operating in the microprocessor before any new interrupts are permitted.

Level 7 interrupt. Several interrupts occur at level 7. A machine check interrupt is set when the DIAC 3 is bus master and a parity error is detected or if a data transfer acknowledge timeout occurs or a DMA timeout occurs. Also, if either the microprocessor 5 or the DIAC 3 is bus master and a "timer interrupt not reset" error occurs from either the programmable timer or the ¼ second timer 13 and 14. Either of these conditions causes a machine check interrupt to be set in the machine check register 11. Such interrupts are reset by an MMI/O instruction from the processor 5 by writing 0's in the machine check register 11. The DMA and MMI/O interface is disabled until the machine check register 11 is reset as noted earlier. A test tool interrupt is also assigned to level 7 in the event that the user wishes to provide a test function externally.

Level 6 interrupt is the address compare - data compare interrupt from the address and data compare function register 12. It causes an auto vector to be generated for error processing in the microprocessor 5 at whatever level was in progress at the time the interrupt occurred.

The level 5 interrupt is the data transition interrupt and unique vector numbers are provided by the port interface controller 10 logic as will be described below for each port.

The level 4 interrupt is a programmable timer interrupt that sets an auto vector for handling the timer functions and it has a higher priority than the DIAC interrupts. The timer interrupt is reset by hardware during the timer interrupt acknowledge cycle. DIAC 3 interrupts also occur on level 4. Unique vector numbers will be supplied by the DIAC for each of the 20 channels which may be interrupting. The DIAC will interrupt whenever byte count for any of the 20 channels is decremented to 0 and service is required.

Level 3 interrupt. The USART 2 character service interrupt is assigned this level. Unique vector numbers are provided by the DIAC for each of the 20 channels. During a level 3 interrupt acknowledge cycle, the DIAC 3 provides a unique vector number corresponding to the highest priority channel with an active interrupt request. This steers the processor 5 to the appropriate service routine where it can implement the appropriate data transfer for the specific channel.

Level 2 interrupt. The USARTs 2 and the port interface registers in the port controller 10 are assigned this level. A vector number supplied by the USART 2 or port controller 10 indicates the reason for the interrupt and indicates the port to which attention is directed.

A level 1 interrupt is the ¼ second timer which provides an auto vector to the microprocessor for handling the ¼ second timer reset and interrupt acknowledge.

A level 0 is the application task level for normal background state.

The interrupt vector number generation is arbitrary and is well known to those of skill in the art. Vector numbers are memory addresses for the microprocessor to use as the starting address for handling each type of interrupt according to the vector number supplied to it.

Returning now to FIG. 2, the bus error/machine check register 11 will be discussed in some greater detail.

The design shown implements this register 11 in a 1 byte configuration. Whenever an error is detected, a bit will be set in the register 11. If the microprocessor 5 is the bus master and the error happens to be a parity error or a data transfer acknowledge timeout error, then a bus error is presented to the microprocessor 5 as shown by the bus error output signal from register 11. If a DIAC 3 happens to be the bus master and the error is a parity error, a data transfer acknowledge timeout error or a DMA timeout error, then a bus check level 7 interrupt will be set as shown by the output from block 11. If either the microprocessor 5 or the DIAC 3 happens to be bus master and a timer interrupt not reset error occurs, a machine check level 7 interrupt will also be set. Error signals are activated to the DIAC when the DIAC 3 is bus master and an error is detected. DMA functions are blocked in this design whenever a bus error machine check register bit is set. The error recovery program operating in the microprocessor 5 must reset bits 0 through 3 in the machine check register 11 by writing all 0's before a DMA operation can proceed and before the DIAC 3, the USART 2 or the character service and port register interrupts can be accepted. Also, whenever a bus error has been detected, an interrupt inhibit latch is set which must be reset by an MMI/O instruction from the processor 5 before interrupts can be again presented to the microprocessor 5. Using a byte read operation, bits 0 through 5 of the register 11 can be read or by using a byte write operation an MMI/O write can be performed. The bits for the bus error machine check register 11 are defined as follows.

Bit 0 is the parity error bit. Parity check on read operations from the RAM 6 or the EPROM 8 set this bit. Bit 4 will be set to indicate whether the processor 5 or the DIAC controller 3 was the bus master when this error occurred.

Bit 1 is an access error or data transfer acknowledge timeout error. This bit is set under a variety of conditions such as an attempted write to a protected area of RAM 6 by the DIAC 3, a write to the protected RAM space 6 by the microprocessor 5 while not in its supervisory data mode, an access to MMI/O space by the DIAC controller 3, an access to the EEPROM by the DIAC or the microprocessor while not in supervisory data mode, an access to the MMI/O space by the processor 5 while not in the supervisory data mode, a read or write to unimplemented storage space, a write to the EPROM or a data transfer acknowledge not returned to the microprocessor 5 within 8 microseconds or if the DIAC 3 becomes bus master and does not deactivate its strobes within 8 microseconds. Any of these conditions will set bit 1 and cause the initiation of the error handling routine for this level.

Bit 2 is the timer interrupt not reset bit. It results in generating the machine check interrupt on level 7.

Bit 3 is the DMA timeout bit. It is set whenever the DIAC 3 receives bus grant and does not return the bus grant acknowledge signal within 4 microseconds. It is also set if the DIAC becomes bus master and does not perform a DMA operation within 2 microseconds.

Bit 4 is the bus master indicator as noted above. This bit is set whenever the DIAC is the bus master and an error is detected. If the bit is already set when a bus error occurs, it remains set so as to provide an indication that the bus error occurred before the machine check interrupt was processed.

Bit 5 is the access type indicator bit and indicates that the operation was a read operation when the bit is set or that a write operation was attempted if the bit is not set.

Bit 6 is not used in this design and bit 7 is a test tool interrupt used for external test tools in laboratory environments only.

The address and data compare and function register 12 is implemented to aid in software debugging and error handling. There is an address detection adapter that includes the address compare register, the data compare register and a function register all contained within block 12. An interrupt is provided on level 6 whenever one of the selected comparisons occurs. The function register bits are defined as follows.

When bit 8 is set and the lower data strobe is active, then the selected comparison function is enabled. Bit 9—if this bit is set and the upper data strobe is active, the selected comparison function is enabled. Bit 10—if this bit is not set, the selected compare function is for the main processor 5 or for DMA. If the bit is set, the selected compare function is for the DMA operation only. Bit 11 is the compare on instruction fetch. Bit 12 is compare on data fetch and bit 13 is compare on date store. Bit 14, when set, initiates the data pattern comparison in which the pattern contained in the data compare register is compared with the data bus during the specified address compare operation. An interrupt is generated only if the specified address compare and the specified data compare occur.

Parity generation and checking. While the parity generators and checkers are standard and are implemented at the interfaces supplied for the dynamic RAM 6 and the EPROM 8, the control logic 4 implements a parity generator and checker for these interfaces. Odd parity is generated for each byte during write operations to the RAM 6 when either the processor 5 or the DIAC 3 is the bus master. Odd parity is checked for each byte during a read operation from RAM 6 and EPROM 8 when either the processor 5 or the DIAC controller 3 is bus master.

Memory data flow. The interface between the processor 5 and the RAM 6 is an 18-bit wide interface with 16 data bits and 2 parity bits. During write operations, data can be stored from the processor 5 from either single bytes or words of two byte width. The DIAC 3 stores data from the USARTs 2 as single bytes. When a processor instruction specifies a byte operation, the processor 5 uses the internal least significant address bit to determine which byte is to be written and then issues the data strobe high or low for that byte. For byte operations when the least significant address bit equals 0, the upper data strobe is issued and the lower data strobe is issued if this bit is 1. When a write operation is a DMA write operation from the DIAC 3, the control logic will decode the state of the least significant address bit for the DMA operation and generate the upper data strobe if the least significant bit is 0 and the lower data strobe if this bit is 1. It may thus be determined whether processor 5 or the DIAC 3 was the bus master for either type of write operation simply by the status of the bus grant acknowledge signal.

As alluded to earlier, only when the processor 5 is in supervisory data mode, can it access the MMI/O space in memory. The DIAC 3 cannot access the processors MMI/O space and an attempted access by DIAC 3 to the MMI/O space will result in a machine check register 11 bit being set at 1. If an attempt at writing a protected space violation occurs, the write operation will be blocked and data at the address location is not altered.

Read operations. Data can be read by the processor 5 as either single bytes or 2-byte words. The DIAC 3 reads single bytes only. Again, the internal least significant address bit is used to determine which byte is to be read and the processor 5 then issues the data strobe for that byte. When the operation is a DMA read operation controlled by the DIAC 3, the memory control logic places 1 byte of data on the data bus and the DIAC selects the upper or lower data byte based on the state of the least significant address bit in the DIAC receive address counter.

Figure 3:
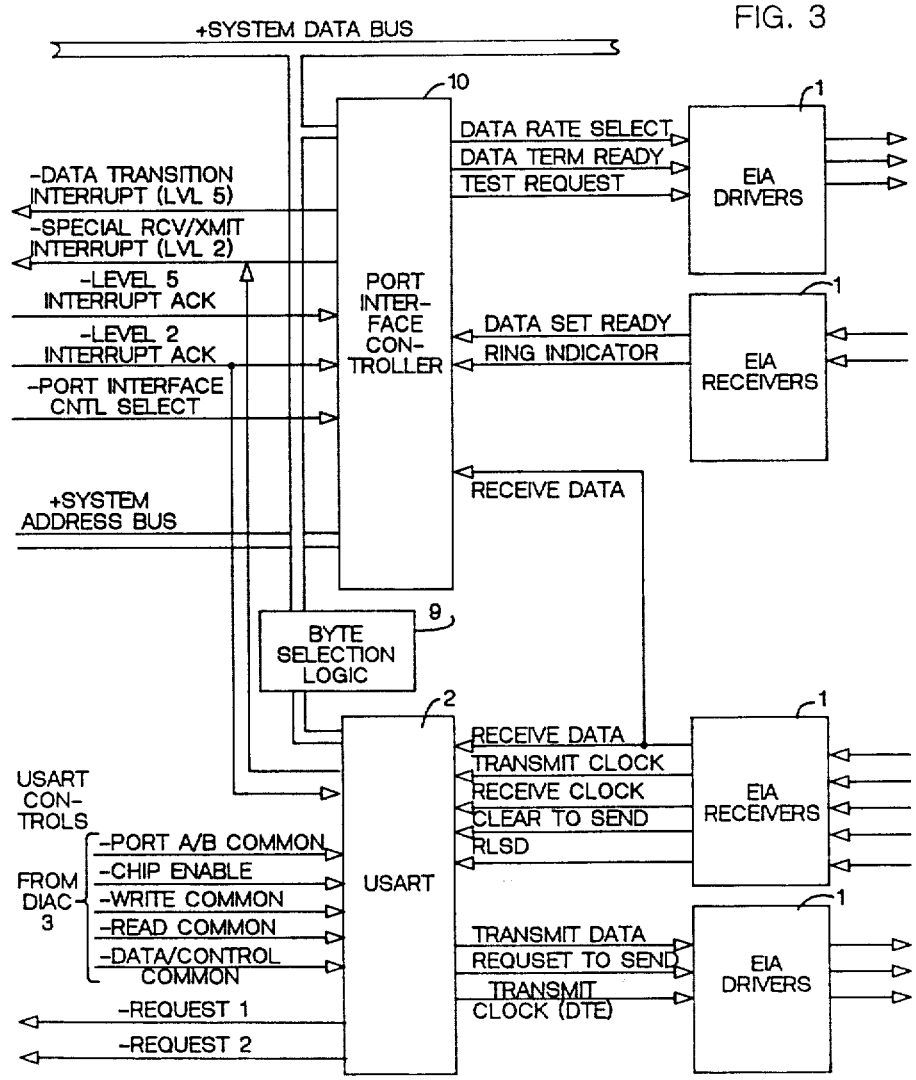
FIG. 3 illustrates in greater detail the port interface controller and USART architecture for a given port 1 in FIG. 1 and is a portion of FIG. 1 to be interconnected therewith by the various signal lines and system busses as shown.

Usart interfaces. Turning to FIG. 3, the USART interface for a given port 1 is shown. The EIA receivers for the port 1 are broken into two sections, depending upon which of the interface line signals is being handled. A port interface controller 10 aids the USART 2 in handling certain of the receive signals such as data set ready (DSR) and ring indicator or receive data (RD). The USART 2 receives receive data, the transmission clock, the receive clock, the clear to send (CTS) and the receive line signal detect (RLSD). It will be understood that the EIA receiver circuits are broken into two blocks only for purposes of illustration, but comprise all of the standard receive signal pins in the EIA interface at each port 1. Similarly, for the transmission or EIA drivers, the port interface controller 10 provides certain signals to the EIA drivers as shown in FIG. 3, while the USART provides the remaining signals as necessary to the drivers. Interfaces to the port interface controller 10 and the USART 2 from the side of the microprocessor 5 and DIAC 3 are via the system data bus, the system address bus and the various request and control lines as shown in FIG. 3 at the left-hand side. These will now be described in some greater detail.

The USART 2 chip select signals include the chip enable line as shown in FIG. 3. Five USARTs are utilized as shown in FIG. 1 so five different chip select lines 1-5 are employed. These are not shown in FIG. 1 and only a single one of them is shown in FIG. 3 since only a single USART 2 is necessary to handle two ports. The USART connections for the second port are not shown in FIG. 3 for simplicity. Whenever the processor 5 desires to perform a memory mapped I/O function to the USART 2, the control logic will activate that individual selected USART 2's chip enable line which selects the USART 2 for a read or write operation. When the DIAC controller 3 performs a DMA operation, the control logic activates the selected enable line also. When the bus grant acknowledge signal is active from the DIAC 3 to the processor 5 in FIG. 1, the DIAC 3 will control the USART chip enable line.

The channel A/B select line is the port enable signal. This is a multi-point signal that selects which channel of the two possible ones serviced by a USART 2 is to be handled with a read or write operation. Arbitrarily, when the signal is positive, channel A of the two serviced by the USART 2 is selected. Channel B is selected when the signal is negative. Only one of the channels is shown in FIG. 3 as previously mentioned. The system address bit 2 is gated to the A/B select line in FIG. 3 whenever the processor 5 is the bus master and desires to perform an MMI/O function to select the USART 2. For DMA operations, when the DIAC 3 provides the signal identifying the channel to be selected, this signal is the DIAC A/B signal which is the port A/B signal in FIG. 3. For simplicity sake, the control lines shown attached to the USART 2 in FIG. 3 are not shown on FIG. 1 but must be understood to emanate from the DIAC 3 in FIG. 1 as shown by FIG. 3. Again, only if the bus grant acknowledge signal from the DIAC 3 to the processor 5 is active, does the DIAC 3 control the channel selection.

There is a data/control selection signal also supplied to the USART 2 in FIG. 3. This is a multi-point signal that defines the type of operation that is to occur with the selected USART 2. Positive signals indicate data operations and negative signals indicate control operations. Positive signals indicate that the receive data buffer is selected when a read operation will be performed. A positive signal indicates that the transmit data buffer is selected when a write operation is to be performed. Negative signals indicate control operations. If the processor 5 is bus master, the system address bit 1 is gated to the data/control line. If the DIAC 3 is bus master, the operation is understood to be either a read of the receive data buffer or a write of the transmit data buffer in the USART 2. When bus grant acknowledge is not active, the processor 5 is bus master and the data/control selection is directly controlled by the state of the system address bit 1 during the USART select operation.

For read operations, the multi-point signal "read" as shown in FIG. 3 indicates a read operation whenever the USART 2 is selected and it enables the USART bus drivers. During the level 2 interrupt acknowledge cycle, this signal gates the interrupt vector from the USART 2 onto the bus whenever the USART 2 is the highest priority USART then requesting an interrupt. The priority is determined by USART position. The coincidence of a read and a write will be interpreted as a reset.

Writing operation. This multi-point signal "write" as shown in FIG. 3 indicates a write operation whenever the USART 2 is selected. The special level 2 USART interrupt request previously described is shown supplied by the port interface controller 10. This interrupt request signal is activated as a multi-point signal to the interrupt control logic 4 whenever any USART 2 has a level 2 interrupt request active. There is also a USART interrupt acknowledge level 2 IACK supplied to the port interface controller 10 and to the USART 2 to acknowledge an interrupt cycle at level 2. During the IACK cycle, the highest priority USART 2 or port interface controller 10 for that port having a pending level 2 interrupt will cause placement of a vector number on the low order byte of the system data bus by the USART 2 or port controller 10 whenever the control logic activates the USART 2's read signal. The interrupt "enable out" signal from USART 2 is connected to the next lower priority USART interrupt "enable in". This interconnection is not shown in FIG. 3, but it is used to form a daisy chain operation in which the higher priority device having an interrupt inhibits interrupts from lower priority devices or enables them if it has no interrupts. USART number 5 is arbitrarily assigned the highest priority and the port register is connected at the lowest end of the chain for level 2 interrupts. The interrupt enable or chip enable line is supplied by the DIAC 3 to the USART 2. This signal indicates that no other higher priority USART 2 has an interrupt under service or under request. The signal is active positive and is used to form the interrupt daisy chain referred to above. The highest priority USART 2 has its interrupt "enable in" connected to +5 volt logic level. If the highest priority USART has a pending interrupt, it will not activate its interrupt "enable out" interconnection to the daisy chain as mentioned above. If it has no pending interrupt, it will activate this pin to enable the next lower priority USART 2 to present interrupts.

The system data bus, bits 0–7, also connects to the USARTs 2 and the port interface controllers 10. The port interface controller port registers are not shown but are connected directly to this bus in the low order byte positions. Parity is not used on the USART interface. The data bus, however, is an 18 bit wide, 16 data plus 2 parity bit bidirectional multi-point bus. The low order byte is used when addressing an odd address and contains bits 0 through 7 and low parity. Bit 0 is assigned the least significance and bit 7 the most significance in the low order byte. The high order byte is used when addressing an even address and contains bits 8 through 15 and parity high for data. Bit 8 is the least significant bit and bit 15 the most significant bit in the high order byte. The data bus is positively active. During an MMI/O write operation from the processor 5 to a USART 2, the data bus is driven by the processor 5. During an MMI/O read operation from processor 5 to a USART 2, the low order byte of the data bus is driven by the USART 2. During an interrupt acknowledge cycle for level 2 interrupts, the USART 2 or the port controller 10 data register places the interrupt vector number on the low order byte of the data bus. During an interrupt acknowledge for level 5 interrupts, the port controller 10 places its interrupt vector number on a low order byte of a data bus.

Port Registers. Port registers are contained in the control logic for each of the ten ports to provide EIA RS232 interface signals and functions such as data transition detection, data set ready transition detection and ring indicator transition detection and the generation of associated interrupt vector numbers not provided by the USARTs 2. These are embodied in the port interface controllers 10 as shown in FIG. 3 and while the registers themselves are not shown, they contain the following bit significance.

Bit 0 is the data set ready active signal from the RA232C interface receiver. The bit may be read only. Bit 1 is the ring indicator bit received from the EIA RS232 interface and is a read only bit.

Bit 2 is the test request driven to the EIA RS232 interface. The processor can write or read this bit and when it is set to a 1, the test request is activated to the interface. System reset will set this bit to a 0.

Bit 3 is the data rate selection signal. The signal is driven by the EIA RS232 interface and can be read or written by the processor 5. When the bit is set to a 1, the data rate selection is activated to the EIA RS232 interface and system reset signals will set the bit to 0.

Bit 4 of the port register is the data terminal ready indicator. This signal is driven to the EIA RS232 interface and can be read or written. Where the bit is a 1, data terminal ready is active to the EIA interface. A system reset also resets this bit.

Bit 5 is the external clock control bit. This register bit is used to select the gating of the external clock signal on the EIA RS232C interface. The program can also read and write this bit. When set to a 1, the transmit clock is from pin 15 of an EIA RS232C interface gated to the input of the USART 2's transmit clock pin. When the bit is 0, the transmit clock from pin 15 of the EIA RS232 interface is de-gated and the USART can then be programmed to provide a clock on its own transmit clock pin. This allows the direct attachment of terminals where the overall controller in this invention provided the clock to the EIA RS232 interface. Again, system reset will set this bit to a 0.

Bit 6 is the modem enable control transition interrupt. When this bit is set, a level 2 interrupt is set whenever a transition occurs on the data set ready indicator bit or if a ring indicator bit changes from off to on. The program in the processor 5 can cause writing or reading of this bit and system resets set it to 0.

Bit 7 is the enable data transition interrupts. When this bit is set to a 1, a level 5 interrupt will be set whenever a transition occurs on the EIA RS232C receive data line. The program can write or read this bit and resets will set it to 0.

There is also a status change port register contained in the port interface controller 10 that provides the status of interrupts caused by receive data transitions, data set ready transitions and the off to on transition of ring indicator signals which can be provided to the system control logic. A 1-byte register provides the status for two ports serviced by a port interface controller 10. The bits are implemented as follows.

Bit 0 is "data set ready" (DSR) off to on transition for port B. Bit 1 is "data set ready" on to off transition for port B. Bit 2 is ring indicator off to on transition for port B and bit 3 is the data transition for port B. Bit 4 is "data set ready" off to on transition for port A, bit 5 is "data set ready" on to off transition for port A. The ring indicator off to on transition for port A is bit 6 and bit 7 is the data transition for port A.

The processor 5 can read and write the registers in the port interface controller 10 and they may be reset under mask operations so that selected bits in the register can be reset alone. The program must reset interrupts caused by these transitions by resetting the bits under a mask. This allows resetting of an interrupt without affecting other asynchronous interrupts that may be contained in the register or may be occurring at the time the register is actually being reset.

This completes the detail and overview of the operation and controls for the preferred embodiment of the invention as depicted in FIGS. 1 through 3. At the heart of the design is the system control logic and the DIAC 3 which allow the great flexibility of service and operation discussed. As noted throughout the specification, the means of data transfer over any of the twenty channels implemented as shown in FIG. 1 can be individually selected by the programmer to be either memory mapped I/O character service interrupt mode or direct memory access mode. If DMA is selected, a further level of selection can be chosen to determine whether the interrupt should be presented to the processor for each character transferred via DMA. DMA operations are controlled by the DIAC controller 3 and this directs the transfer of one character at a time from the USARTs 2 to the main RAM or from RAM 6 to the USART 2. Usart 2 activates a receive DMA request whenever its receive buffer contains a character. The USART activates a transmit DMA request whenever its transmit buffer is empty. DMA requests are handled by the DIAC controller either as DMA requests, interrupt requests, or as both DMA and interrupt requests, depending upon how the programmer decided to select the configuration. Each port has a receive channel and a transmit channel that can be configured separately to operate using DMA transfer or interrupt mode to signal the main processor 5 for the transfer of a character via MMI/O operations. Whenever a channel is to be operated in DMA mode, the control program will initiate a starting address and a byte count for that channel. The DIAC controller will signal the processor 5 via an interrupt whenever the receive byte count becomes 0 or when the transmit byte count becomes 0. When an end of file message is received, the upstream USART will signal the processor 5 via an end interrupt that the message is complete. When the entire block of data has been assembled from a downstream USART, the processor will direct the DIAC to start the upstream transmission from a specified buffer address in RAM. The DIAC controller 3 is controlled and set by MMI/O operations from the processor 5.

As noted, USARTs maintain a per line protocol interface to attached modems or locally attached terminals while the control program operating in the processor 5 will perform protocol conversion, line concentration and data manipulation functions as desired.

Multiple Port Communication Adapter Implementation

Figure 4A:
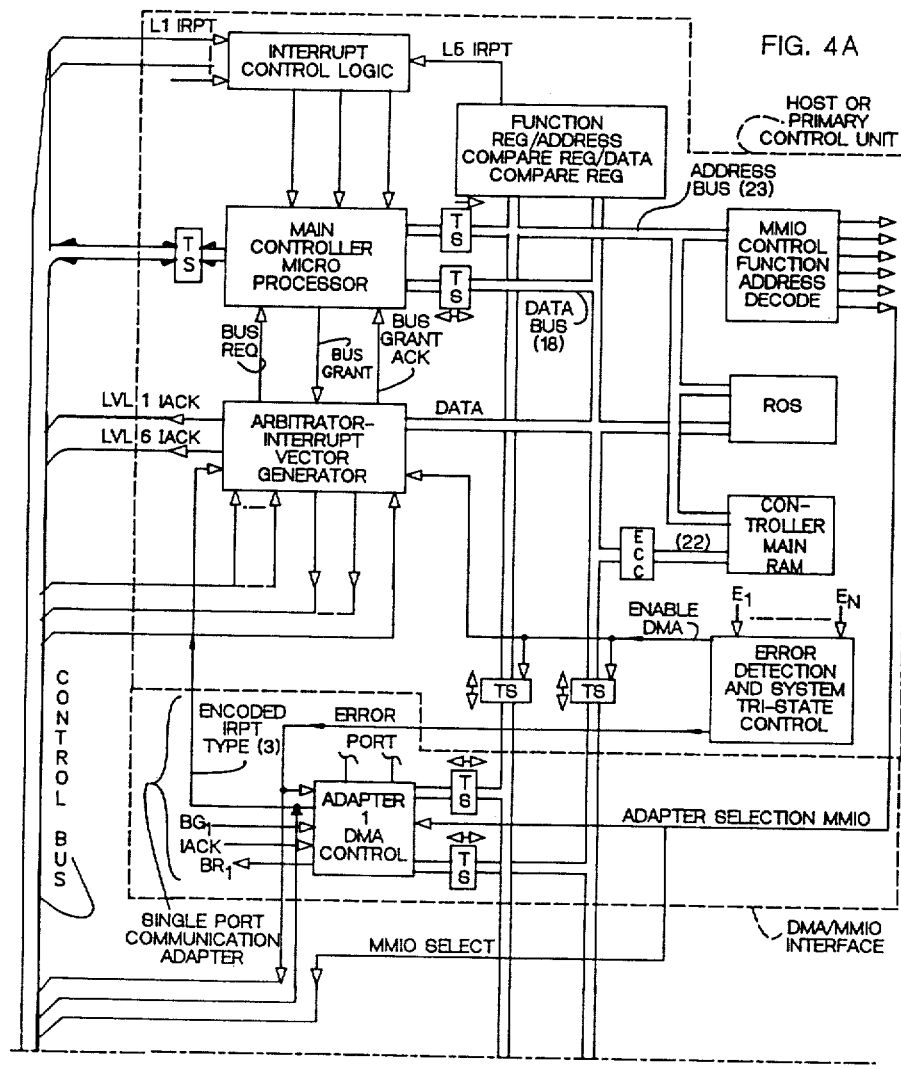
Figure 5:
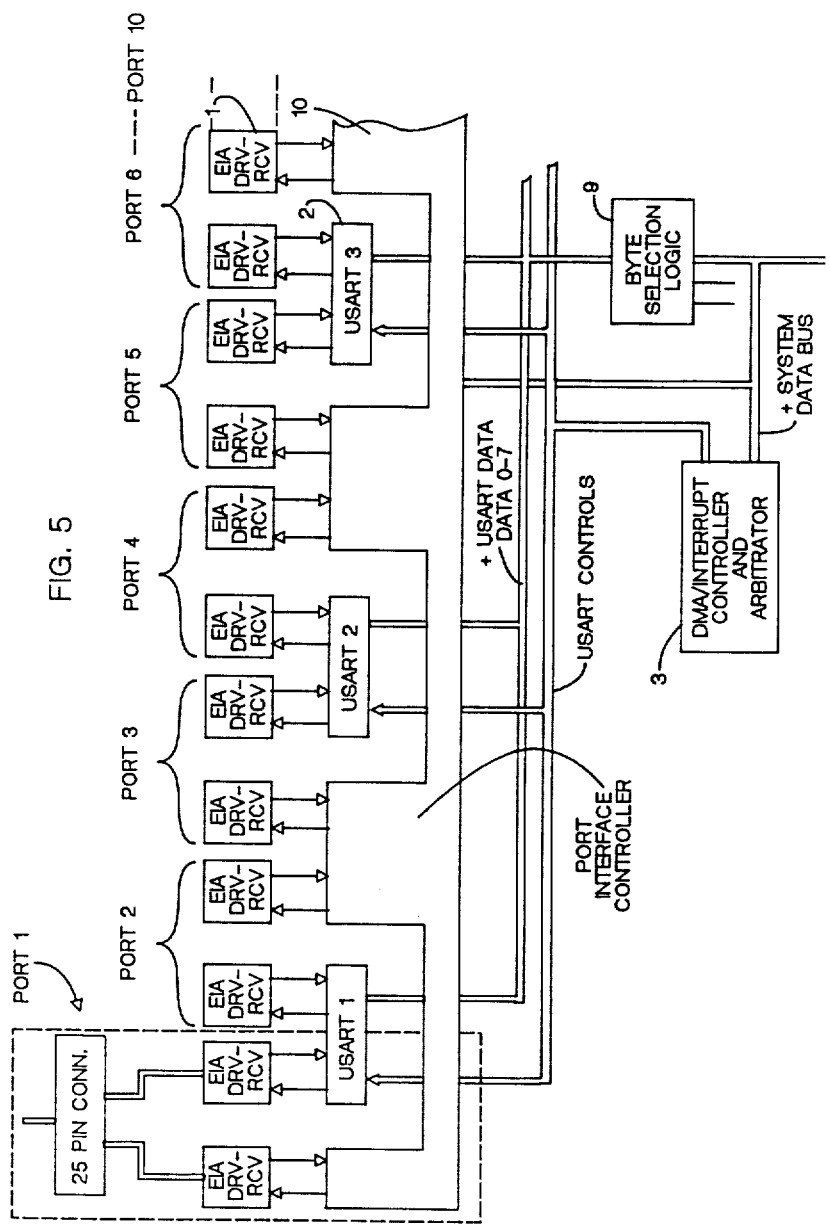
FIG. 5 illustrates the layout and data flow interconnections for the port interface controller and USART controls as utilized for the ports in FIG. 1, specifically for those elements of FIG. 1 enclosed within the dotted box labeled FIG. 5.

FIG. 4 shows another preferred embodiment of the invention in which the protocol adapter and port interface communication controller (called simply "adapter" for clarity in this section) can be provided with an additional bus interface attachment to the system busses of a scannerless communications controller (called simply "communications controller" herein) as described fully in our co-pending application commonly assigned as Ser. No. 06/744,851 filed 6/4/85. This addition to the adapter and to the communications controller permits a multiple port adapter to attach to a single port of the scannerless communications controller. It utilizes the basic architecture and structure of the protocol adapter and port interface controller as shown in FIG. 1 and an additional interface control logic module 15 to interface to the system address and data busses of the scannerless communications controller as shown in FIG. 4. The control program for the adapter function is placed in the read only memory 8 and/or in the adapter random access memory 6.

The scannerless communications controller has up to 16 attachment interfaces; thus by attaching 8 additional ports to each port through the facility of the 10-port protocol adapter and port interface controller of the present invention, an overall system of 128 ports may be serviced from a host system through a scannerless communication controller attached to 8 of the port interface controller configurations as shown in FIG. 1.

The combination provides the basis for an overall new architecture for communication controllers having protocol conversion and some concentration functions off-loaded to the protocol adapter and port interface communication controllers of the present invention.

In such a new architecture, arbitration of competing DMA and interrupt requests, DMA and interrupt control for access to and from the ports and selectable mode of character service for each channel can all be handled by the protocol adapter and port interface communications controller of the present invention. However, the DIAC can be directed to read or write from either the protocol adapter's RAM or the main communication controller RAM and either function can be done with or without interrupting either the processor 5 or the main processor residing in the communications controller. At least five modes of character service for each receive channel and each transmit channel can be thus selected under program control. The program resides in the adjustable protocol adapter and port interface communication controller of the present invention which is configured with the necessary interface control logic 15 for attachment to the scannerless communications controller as shown in FIG. 4.

These modes of character service are briefly as follows:

DMA of received characters to be removed from a USART's receive buffer to the adapter's RAM 6 via straight DMA without interruption of the processor 5. DMA of the received character from the USART's receive buffer to the main RAM of the communication controller without interruption of either the processor 5 or the main processor in the communication controller. Or direct memory access with the received character removed from the USART receive buffer to the RAM 6 via DMA with an interrupt indication given to the processor 5 can be done. Alternatively, a DMA transfer of the received character from the USART receive buffer to the system main RAM in the communication controller may be made via DMA with an interrupt given to the communication controller's main processor. Finally, a DMA access may not be used at all and, instead, an interrupt may be provided to the processor 5 to call an interrupt servicing routine to direct the processor 5 to service the USART with an MMI/O operation to read the USART receive buffer. Character service for each transmit channel can also be selected under program control in symmetrical fashion to the modes of service provided for reception as listed above.

The great flexibility provided by the DIAC controller 3 allows the programmer to customize the operation of each of 128 communications channels to obtain maximum performance from the hardware. For example, if a given port is to be operated in start-stop mode, the programmer may choose to operate that port's receive channel in a mode where the processor 5 is interrupted when each character is received. This allows the processor to monitor for reception errors and to convert characters to new formats or protocols one at a time if desired. The transmit channel for the same port could be programmed to operate in a DMA mode which would allow the program to directly transmit outbound messages without interrupting the processor 5 until a complete message is transmitted, thus enabling a processor cycle-efficient and high speed operation outbound to be performed. By this means, data transfer over any of the 20 total channels can be individually selected and directed by the program to be either MMI/O or DMA with or without the interrupt presented to either processor.

Configuration of Data Flow With Communications Controller

The data flow of the adjustable protocol adapter and port interface communications controller with the scannerless communications controller attachment is essentially the same as that previously described for the adapter, but with the additional capability of transferring data from the adapter to the main memory located in the scannerless communication control unit. Either the DIAC 3 or the processor 5 can address its local RAM 6 or the main RAM in the communications control unit. Address bit 23 is used to select addressing of one RAM or the other. If address bit 23 is activated during an adapter machine cycle, the adapter interface control logic 15 will activate a DMA request to the communications controller's arbitration circuit. The communications controller's main processor will grant bus mastership to the adapter in turn, in the order of its priority and the interface control logic 15 will direct the transfer to or from the system main RAM in the communication control unit. The capability exists for moving data directly from the USART's 2 to or from the local RAM 6 in the adapter or to or from the main RAM in the communications controller. The transfer of data can also be performed under control of the DIAC 3 or the adapter processor 5.

System Data Flow Initiation

Each adapter has a communication region located in the main RAM of the communications controller. The communication region contains a device status word (DSW) and a device control word (DCW) for each adapter. The location of the DCW and DSW in main RAM is determined by the adapter's physical position in the scannerless communication controller's port hierarchy. When the communication controller is reset, the control program that it operates initializes the DSW and DCW for each adapter that is installed. The DCW is constructed by the control unit's main processor microcode and is read by the adapter's processor 5. The DCW contains a command byte and an outbound or inbound buffer address plus other fields that vary depending upon the command. During operation, the DSW is constructed by the adapter microprocessor code operating in processor 5. Fields that report the status of the adapter processor 5, the quality of data reception, the current execution sequence and the address of the last buffer used for data transfer are constructed by the processor 5. When the adapter processor 5 detects an interrupt from the main communication control unit, it transfers the DCW from its assigned communication region in the control unit's main RAM via DMA into its own memory or registers and then interrogates the command byte.

One of the many possible commands is the initial program load IPL command. This command causes the adapter to IPL its operational code using a DMA transfer from the main RAM in the communications control unit. The main RAM starting address for the IPL code is contained in the DSW constructed by the communication controller's processor at initialization.

When a command has been executed, the adapter processor 5 writes an ending status via DMA transfer into its related DSW in the main RAM of the communication control unit. The adapter processor 5 then signals the control unit processor via an adapter control unit interrupt.

In summary, microcode operating in the control unit's main processor creates the DCW and then interrupts the adapter's processor 5. The adapter processor 5 reads the DCW via a DMA operation. The adapter processor 5 microcode creates a DSW in the main RAM using a DMA write operation and then interrupts the control unit's main processor. The control unit processor reads the DSW from its own main RAM. Therefore, the adapter processor 5 and the control unit processor can communicate with each other through the communication regions assigned for each individual adapter.

Data Buffers

Data buffers are addressed in the DCW and reside in the main RAM of the communication control unit. They are accessed by adapters processor 5 using DMA transfers. The buffer size is fixed at 288 data bytes in this design which includes a control prefix. When larger blocks are to be transmitted or received, multiple buffers may be furnished to the adapter processor by request to the main communication control processor. A prefix field at the front of each buffer contains the owning task identification, a forward pointer, a data start offset and a byte count. If the forward pointer content is positive, it supplies the address of the next buffer in the chain from which the adapter's processor 5 must transmit or into which it may receive. The data start offset allows data to begin other than at the buffer's initial or front address, which leaves a space to be prefixed with different line protocol control characters as may be necessary for protocol conversion.

The DCW Commands

When an adapter processor 5 detects an interrupt from the main control unit, it must transfer the DCW from the assigned communication region via DMA and interrogate the command byte. Examples of commands that may be executed are as follows:

Write. The contents of the buffer whose first address appears in the DCW is transmitted onto the communication line. The number of bytes is specified in the byte data count.

Read. The adapter is conditioned to receive and the resulting data is stored in the buffer identified in the DCW. The number of bytes stored is limited by the data count or end of block detection, whichever occurs first.

Direct Memory Access Interface Control Logic

This section describes the FIG. 4 direct memory access/memory mapped I/O interface and the interface control logic 15 located in the adapter to provide the connection of the adapter to the scannerless communications controller busses.

The communications controller DMA bus provides an 18 bit (16 data plus 2 parity bits) bidirectional data bus between its memory and the attached adapters. The interface supports byte or word (2 bytes) transfers.

DMA data bus integrity is assured by the use of a parity bit associated with each byte of the data bus. correct parity is always odd (i.e., the number of parity and data bits that are '1' must be odd for each byte). Parity generation and checking is included in the interface control logic 15.

Interface Control Logic and Signal Descriptions

Figure 14:
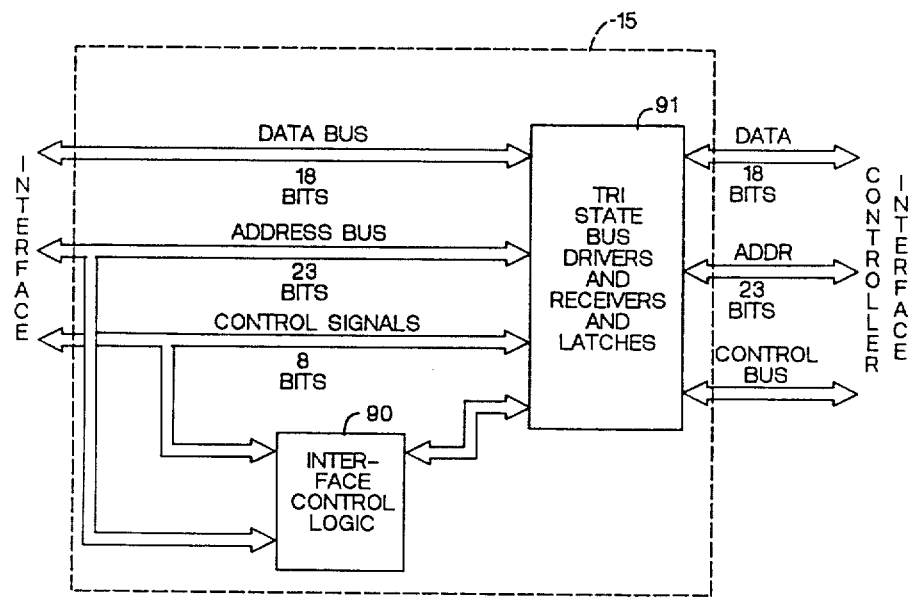
FIG. 14 is an enlarged detail of the interface control logic 15 from FIG. 4.

The interface control logic (15) provides timing and control for gating signals to/from the controller interface. The interface control logic (90) shown in FIG. 14 provides the timing and direction control to the tri-state drivers and receivers (91) to control the following interface signals during data transfers to/from the main RAM in the communications controller.

Data Bus

The data bus is an 18 bit (16 data plus 2 parity bits) bidirectional multipoint bus. The low order byte is used when addressing an odd address and contains bits 0–7 and PL (parity low) of the data. Bit 0 is the least significant bit and bit 7 is the most significant bit in the low order byte. The high order byte is used when addressing an even address (the same address as a word address) and contains bits 8–15 and PH (parity high) of the data. Bit 8 is the least significant bit and bit 15 is the most significant bit in the high order byte. The data bus is positive active. During a DMA read operation or during an MMIO write operation from the communications controller to an adapter, the data bus is driven by the commnunications controller. Also, when a DMA operation is not in process, the data bus is driven by the communications controller to allow monitoring by a test tool adapter.

Address Bus

The DMA address bus is a multipoint bus which is driven by the bus master for all DMA operations. The address bus contains the address of the location in memory space to be accessed. The address bus is a 23 bit bus with A1 being the least significant bit and A23 being the most significant bit. The address bus is positive active. The 23 bit address bus is used in conjunction with the upper data strobe and the lower data strobe to select either a single byte address or a word address. When only one data strobe is active, the operation is a byte operation. When both data strobes are active, the operation is a word (2 bytes) operation. When a DMA operation is not in process, the address bus is driven by the communications controller to allow monitoring by the test tool. This bus is also driven by the communications controller during MMIO control operations from the communications controller to the adapters.

Control Bus Write

This multipoint signal is driven by the bus master to indicate the direction of transfer on the data bus for all Input/Output operations. During a DMA operation, the activation of this signal indicates that the data transfer is from the bus master to memory. During a DMA operation, the non-activation of this signal indicates that the data transfer is from memory to the bus master and is referred to as a read operation. When a DMA operation is not in process, this signal is under control of the communications controller. The communications controller activates this signal when performing a write operation. Write is a negative active signal.

Level 1 Interrupt

Level 1 interrupt is a multipoint signal which is driven by any adapter which has a pending level 1 interrupt interrupt to the communications controller. An adapter activates this signal when it has a data interrupt or an adapter machine check interrupt. Level 1 interrupt is a negative active signal.

Level 6 Interrupt

Level 6 interrupt is a multipoint signal which is driven by any adapter which has a pending level 6 interrupt to the communications controller. An adapter activates this signal which it has a control interrupt. Level 6 interrupt is a negative active signal.

Level 1 Interrupt Acknowledge (L1IACK)

L1IACK is a multipoint signal which is activated by the main processing unit in the communications controller when the processor 5 performs an interrupt acknowledge cycle for level 1 interrupts from adapters. L1IACK is a negative active signal.

Level 6 Interrupt Acknowledge (L6IACK)

L6IACK is a multipoint signal which is activated by the main processing unit in the communications controller when the processor 5 performs an interrupt acknowledge cycle for level 6 interrupts from adapters. L6IACK is a negative active signal.

Bus Request/Interrupt Request Bus

This is an 18 signal bus with one line assigned to each adapter position. This bus is multiplexed to handle bus requests and adapter interrupts. When the main processing unit in the communications controller does an interrupt acknowledge cycle for level 1 interrupts, the system logic in the communications controller activates the level 1 interrupt acknowledge (L1IACK) signal to the adapters. When th processor in the communications controller does an interrupt acknowledge cycle for level 6 interrupts, the system logic in the communications controller activates the level 6 interrupt acknwledge (L6IACK) signal to the adapters. When L2IACK is active, the adapter activates its bus request-/interrupt acknowledge line if the adapter has a level 6 interrupt presented to the communications controller. When L1IACK and L6IACK are not active, the adapter activates its bus request/interrupt acknowledge line if it has a DMA request. Bus request/interrrut acknowledge is a negative active signal.

Bus Request Operation—When L1IACK and L6IACK are not active, an adapter which has a DMA request, activates its bus request/interrupt acknowledge line. The bus request/interrupt acknowledge line is driven by any unit which requires control of the bus for input/output operations. When an adapter activates its bus request/interrupt acknowledge line for a bus request, it must keep it active until it has gained bus ownership. The bus request must be removed if L1IACK or L6IACK becomes active or if the adapter is disabled. Bus request must not be prematurely withdrawn unless the unit is disabled. When a bus master has gained ownership of the bus and is prepared to do its last or only transfer, its bus request signal must be deactivated and stable prior to its activating address strobe. The bus master completirg its last transfer must not reactivate its bus request until it deactivates the address strobe for the transfer in progress.

Interrupt Acknowledge Operation—When the processor in the communications controller is doing an interrupt acknowledge cycle for level 1 interrupts, the L1IACK line is activated to the adapters. When the processor in the communications controller is doing an interrupt acknowledge cycle for level 6 interrupts, the L6IACK line is activated to the adapters. The activation of L1IACK or L6IACK signals the adapters to remove their bus requests from the bus request/interrupt acknowledge bus. If L1IACK is active, an adapter with a level 1 interrupt presented to the communications controller should activate its bus request/interrupt acknowledge line. If L6IACK is active, an adapter with a level 6 interrupt presented to the communications controller should activate its bus request/interrupt acknowledge line. The interrupts are encoded in the arbitration logic in the communications controller and presented to the processor in the communications controller as a prioritized interrupt vector number. The vector number that is generated depends on the code which the adapter places on the three encoded interrupt type lines when the adapter recognizes its bus grant/interrupt taken signal active during L1IACK or L6IACK.

Bus Grant/Interrupt Grant Bus

This is an 18 signal bus with one line assigned to each adapter position. This bus is multiplexed to handle bus grants and for signaling an interrupting adapter that its interrupt is being taken by the communications controller. When an adapter recognizes its bus grant/interrupt taken signal active during L1IACK or L6IACK, the adapter activates the encoded interrupt type lines to correspond to the type of interrupt that is being presented to the communications controller (data, adapter machine check or control). The adapter must also reset the interrupt that was being presented on the interrupt line. Bus grant/interrupt taken is a negative active signal.

Bus grant operation—This signal is driven by the bus arbitration logic in the communications controller to the device that is to assume ownership of the bus. Since there is more than one unit which may be requesting ownership of the bus, the system provides arbitration logic that resolves which unit will be allowed to control the bus. A star method of arbitration which provides prioritization based on position is implemented. The adapter installed in position 1 will be the high priority adapter and the adapter installed in the last position will have the lowest priority. Bus grant will not deactivate once activated, until after an activation of bus grant acknowledge and address strobe or upon detection that the bus grant was not accepted. Bus grant deactivates immediately after the activation of address strobe to allow maximum time for arbitration resolution and for maximum utilization of the bus. Adapters must not activate any signals on the bus in the capacity of bus masters unless they have detected the activation of bus grant which they have an active bus request. Additionally, address strobe, data transfer acknowledge, and bus grant acknowledge must have been deactivated by the previous bus master before the next bus master activates any signals on the interface.

Interrupt taken operation—When L1IACK or L6IACK is active, the control logic in the communications controller will activate the bus grant/interrupt taken signal to the adapter whose interrupt is being acknowledged. When an adapter recognizes its bus grant/interrupt taken line active while L1IACK or L6IACK is active, the adapter activates the encoded interrupt type lines to correspond to the type of interrupt being presented to the communications controller (data, adapter machine check or control). A unique interrupt vector number will be generated in the communications controller to correspond to the three types of interrupts from each adapter. The adapte must also reset the interrupt presented on the interrupt line.

Encoded Interrupt Type Bits 0, 1 and 2

These negative active multipoint signals are encoded to indicate the type of interrupt that is being presented to the communications controller by the adapter whose interrupt is being acknowledged. When an adapter recignizes its bus grant/interrupt taken line active while L1IACK or L6IACK is active, the adapter activates the encoded interrupt type lines to correspond to the type of interrupt being presented to the communications controller (data, adapter machine check or control). A unique interrupt vector number will be generated in the communications controller to correspond to the three types of interrupts from each adapter. The adapter must also reset the interrupt presented on the interrupt line.

Encoded Interrupt Type Bits 0, 1 and 2

These negative active multipoint signals are encoded to indicate the type of interrupt that is being presented to the communications controller by the adapter whose interrupt is being acknowledged. The adapter which receives bus grant/interrupt taken during L1IACK or L6IACK, places its encoded interrupt type on the encoded interrupt type bits 0, 1 and 2. The interrupt types are data interrupts, adapter machine check interrupts and adapter control interrupts. The system logic in the communications controller generates a unique interrupt vector number based on which adapter's interrupt is being acknowledged and the type of interrupt that is being acknowledged. The interrupt type encoding is as follows:

| Bit 2 | Bit 1 | Bit 0 | Interrupt Type |
|---|---|---|---|
| inactive | inactive | inactive | Reserved (Invalid Encode) |
| inactive | inactive | active | Reserved (Invalid Encode) |
| inactive | active | inactive | Data |
| inactive | active | active | Control |
| active | inactive | inactive | Adapter Machine Check |
| active | inactive | active | Reserved |
| active | active | inactive | Reserved |
| active | active | active | Reserved |

Bus Grant Acknowledge

'Bus grant acknowledge' (BGACK) is a multipoint signal which is used for obtaining bus mastership during DMA operations. 'Bus grant acknowledge' is a negative active signal.

DMA operation—'Bus grant acknowledge' is a signal activated by the adapter that has an active 'bus request' and receives 'bus grant'. After receiving 'bus grant', the adapter must wait until 'address strobe', 'DTACK', and 'BGACK' from the previous bus master are deactivated before it activates its own 'BGACK'. 'Bus grant acknowledge' must be held active until completion of the input/output operation. Bus mastership is terminated at the deactivation of 'bus grant acknowledge'.

Address Strobe

Address strobe is a multipoint signal that is driven by a bus master when it executes a DMA operation. For a DMA operation, the address strobe signal must be driven such that the address bus signals are valid and stable at the time address strobe is activated through the time address strobe is deactivated. When a DMA operation is not in process, address strobe is under control of the communications controller and is activated by the communications controller during communications controller memory cycles. Address strobe is a negative active signal.

Upper Data Strobe

Upper data strobe is driven by a bus master when a single byte operation is performed and the byte is the high order (even address) byte. Both upper data strobe and lower data strobe are activated for word operations. When a DMA operation is not in process, upper data strobe is under control of the communications controller and is activated by the communications controller during communications controller memory cycles which read or write the upper byte of data. Upper data strobe is a negative active signal.

Lower Data Strobe

Lower data strobe is driven by a bus master when a single byte operation is performed and the byte is the low order (odd address) byte. Both lower data strobe and upper data strobe are activated for word operations. When a DMA operation is not in process, lower data strobe is under control of the communications controller and is activated by the communications controller during communications controller memory cycles which read or write the lower byte of data. Lower data strobe is a negative active signal.

Data Transfer Acknowledge

Data transfer acknowledge is a multipoint signal driven by the slave device (memory control, system MMIO logic or an addressed adapter) during an input/output operation. It allows for asynchronous operation between the adapters and the communications controller memory system during DMA operations and asynchronous operation between the main communications controller processor and the adapters during main communications controller processor MMIO operations. For a write operation data transfer acknowledge is an indication that the slave device has captured the information on the interface and the operation may proceed. For a read operation, data transfer acknowledge is an indication that data has been placed on the data bus by the slave device and that the operation may proceed. During a DMA operation, the slave device is the communications controller memory control and data transfer acknowledge is supplied by communications controller memory control. During a MMIO read or write cycle from the communications controller to an adapter, the addressed adapter is the slave device and must supply the data transfer acknowledge signal to the communications controller. Once data transfer acknowledge is activated, it must remain active while address strobe is active, then deactivate after the deactivation of address strobe. Data transfer acknowledge is a negative active signal.

Error

Error is a multipoint signal which is driven by the memory control system logic. The error signal is an indication of one of the following:
- Bad parity on data received from the adapter.
- Read or write to unimplemented storage.
- Write to ROS.
- Timeout condition resulting from an adapter which has received bus grant but has not responded with bus grant acknowledge within two microseconds.
- Timeout condition resulting from an adapter not deactivating its strobes within a timeout period.
- Double bit error being detected on a read operation or a double bit error being detected during the read portion of the read-modify-write cycle for a byte write operation.
- Storage protection violation which occurs if an adapter tries to write to the protected area of RAM space or tries to access the MMIO area of the communications controller.

The error signal must only be detected as an input by the active bus master. The bus master which detects the error signal must disable any signals which it has activated on the interface to the communications controller. The error signal will be activated prior to or coincident with activation of the data transfer acknowledge signal. Error is a negative active signal.

System Reset

System reset is a negative active signal which is activated by the communications controller when one of the following types of reset occurs:
- Power on reset
- Reset executed by MMIO
- Reset from the service adapter
- Disk dump reset from the operator panel
- Execution of the processor's reset instruction System reset does not reset the adapter in the service adapter position when that adapter is the source of the reset.

MMIO Select

This is a negative active signal which is activated by the main communications controller's processing unit during an MMIO operation to an adapter. The adapter decodes the low order 8 bits of the address bus while adapter select is active to determine which adapter is selected and which function is to be performed.

Interface Control for Receive Operation

The DCW which is read from system RAM contains the address information that is used by the adapter to address RAM during the DMA data transfer. The data buffers are mapped in RAM such that the adapter can directly address the RAM during DMA operations. The RAM is located in address space such that bit 23 of the system address is not activated during RAM accesses. When an adapter performs a DMA write operation, the adapter performs a write operation with bit 23 active. An operation with bit 23 active sets a DMA request latch in the interface control logic 15. This activates a DMA bus request to the communications controller. The arbitration logic in the communications controller will activate a bus grant signal to the adapter when the adapter becomes the highest priority adapter with an active DMA bus request. During the time between bus request and bus grant, the adapter is held in the write cycle with its address bus, data bus and its control signals active. When the adapter receives bus grant, the interface control logic 15 activates the bus grant acknowledge signal and then sequentially does the following:

The adapter's address bus is gated to the DMA address bus except bit 23 is driven to the inactive state to accomplish the correct mapping to system RAM.

The adapter's control signals are gated to the DMA control signals and are timed to meet the processor's timing specifications.

Since this is a write operation, the adapter's data bus is gated to the DMA data bus.

Memory control logic in the communications controller performs the write operation to the system RAM and activates the data transfer acknowledge signal to the adapter when the data is written to RAM.

When the adapter receives the data transfer acknowledge signal, the interface control logic sequentially deactivates the signals to the DMA interface and the adapter processor completes the write operation cycle.

This sequence is repeated for each byte received from the communication line until end of block is received.

Interface Control for Transmit Operation

When an adapter performs a DMA read operation, the adapter performs a read operation with bit 23 active. An operation with bit 23 active sets a DMA request latch in the interface control logic 15. This activates a DMA bus request to the communications controller. The arbitration logic in the communications controller will activate a bus grant signal to the adapter when the adapter becomes the highest priority adapter with an active DMA bus request. During the time between bus request and bus grant, the adapter is held in the read cycle with its address bus, data bus and its control signals active. When the adapter receives bus grant, the interface control logic 15 activates the bus grant acknowledge signal and then sequentially does the following:

The adapter's address bus is gated to the DMA address bus except bit 23 is driven to the inactive state to accomplish the correct mapping to system RAM.

The adapter's control signals are gated to the DMA control signals and are timed to meet the processor's timing specification.

Since this is a read operation, the adapter's interface control logic 15 is conditioned to receive data from the DMA interface.

Memory control logic in the communications controller performs the read operation to the system RAM and activates the data transfer acknowledge signal to the adapter when the data is active on the DMA interface.

When the adapter receives the data transfer acknowledge signal, the interface control logic 15 sequentially deactivates the signals to the DMA interface as the adapter processor completes the read operation cycle.

This sequence is repeated for each byte to be transmitted to the communication line until the DMA transmit count becomes zero.

From the foregoing description, it may be appreciated that both the programmably adjustable protocol adapter and port interface communication controller and its combined configuration with the scannerless communication controller both rely heavily upon the unique structure and architecture and control logic of the DIAC 3. DIAC 3 is unique in that it handles both direct memory access arbitration and interrupt arbitration for a relatively large number of channels. No previous architectures or structures are known that perform this function for both DMA and interrupt driven multiport communications devices. This invention provides an improved means for transferring data to or from numerous communication channel devices such as the USARTs 2 within a processor based communications system in such a manner that the optimum mode of data transfer may be individually programmed for each channel as system environment conditions demand. The invention further provides a hardware efficient architecture for implementing data transfer with minimal requirements on the actual devices serviced.

Overview of the DIAC Controller

The DMA/interrupt controller or DIAC controller 3 as it has been called herein, is the key to the communications system constructed about it. A primary system hardware architectural consideration in the communications field is the mechanism employed for transferring data between receivers and transmitters. Where the receivers are the processor's memory and the transmitters are the input buffers, or vice versa for the opposite data transfer direction, two common and distinct approaches for data service are the character driven interrupt method and the direct memory access method of data movement.

In the interrupt driven character service method, when a communications device, typically a USART, is ready to transmit or receive the data character, it interrupts a processor. The processor, after identifying the interrupting device through a unique interrupt vector presented by the device, usually enters an interrupt service routine that eventually causes it to execute the data transfer operation. It is usually desirable to transfer data to or from a buffer region in random access memory. Therefore, if the interrupting device is a receiver, the main processor will access its receive data and write it into its appropriate RAM location. Conversely, if the device is a transmitter, the main processor will access the appropriate RAM location and transfer data to the transmitter for sending. This mechanism allows a relatively simple system design but is very costly in terms of the number of processor cycles required to accomplish the transfer.

Another mechanism widely used to achieve data transfer is the direct memory access method. Generally, this method employs a specialized processor called the DMA controller. This executes the transfer by taking control of the required busses and by moving data between the receiver or transmitter and the system's main RAM without the continuous involvement of the processor. A DMA controller will move a block of data before interrupting the main processor. Although this method is efficient for handling communication channels with block data movements, it adds a significant degree of complexity and inflexibility to the overall system design. Furthermore, available DMA controller devices typically handle relatively few channels, on the order of two to four, and the drawbacks become significant when the system is required to handle numerous channels in the DMA mode, such as in the present invention.

From the foregoing it will be appreciated that the optimum method of data transfer for a given channel is dependent upon the type of communication intended for that channel at any given time. For example, if a channel 1 is to transmit data using synchronous data link control (SDLC) protocol, usually at a high baud rate, then the DMA mode of operation will be preferred. Conversely, if another channel, channel 5, is dedicated to receive data in a start-stop format at a relatively low baud rate, it will be advantageous to service that channel in a character interrupt driven mode. It is unfortunate that the mechanism chosen for data transfer for a given channel usually will dictate the hardware of the entire system architecture. This poses serious limitations on systems that are designed to handle a variety of communication channel configurations. For example, communication ports designed to handle slow speed start-stop devices in one application may not be at all suited to handle high speed SDLC type of device information transfers. Furthermore, the dynamic reconfiguration of data transfer mechanisms for a given channel may be entirely impossible without unique hardware modifications.

It is for this specialized and difficult problem that the direct memory access/interrupt arbitrator and controller architecture as exemplified by the preferred embodiment of the DIAC 3 was developed. The result of the architecture has been incorporated into a single NMOS VLSI chip having the following general characteristics:

The DIAC 3 provides a high performance data transfer mechanism and can handle a multitude of communications channels at once. Twenty channels are implemented in the preferred embodiment shown in this application, but there is virtually no architectural limit to the number of channels that might be serviced. The architecture also provides an optimum amount of data transfer for each channel that can be selectively modified. Furthermore, the transfer mode can be dynamically reconfigured at any time. In addition, the interface is simple enough so that the DIAC architecture may have application in a variety of processor based systems other than the one currently envisioned as set forth in the preferred embodiment. The architecture enables a large number of communication channels to be serviced with a minimal amount of hardware and interconnection. A significant cost savings results as will be appreciated by those skilled in the art. FIG. 1 shows a DIAC 3 residing within the programmably adjustable protocol adapter and port interface communications controller invention. The interface to the DIAC consists of the following:

Individual request inputs from each communication channel connects to the DIAC 3. In the case illustrated, the communication devices are universal asynchronous synchronous transmitter receivers known as USARTs 2. Each USART services two receive channels and two transmit channels when the vendor supplied standard USARTs of the type mentioned earlier are utilized. A request is activated by the USARTs whenever a channel desires to receive or transmit a data character. The other interfaces are bus access controls used to take control of system busses during DMA operations. These control lines consist of the DMA bus request, the DMA bus grant and the DMA bus grant acknowledge signals. In the system shown, these signals communicate directly with the main processor 5 in FIG. 1. Additional interface signals are the interrupt controls for communicating status to the processor 5 and the address data and control busses for data transfer operations. These interfaces are quite simple and may be easily accommodated by any of a variety of processors and USARTs with minimal requirement in the way of specialized control logic interfaces as will be appreciated.

In the design shown in FIG. 1, each of the five USARTs 2 employed in the system has two receivers and two transmitters with individual request lines for each channel. As shown in FIG. 1, the request lines are wired to the DIAC 3 and labeled request 0 through request 19. By convention in this design, odd numbered request lines are designated as coming from receiver channels, while even numbered request lines come from transmitter channels. The DIAC 3 facilitates data transfer between the USART 2 channels and the system storage (either main RAM, EPROM or EEPROM or the main processor 5) either by the DMA method or the character interrupt driven method. The DIAC 3 can be controlled in such a manner that any of the 20 channels can be serviced in either mode of data transfer. The main operation consists of presenting a request whenever a given channel requires a data transfer service. The DIAC 3 will then service the request according to the designated mode of data transfer for that channel.

Detail of DIAC 3

Figure 6B:
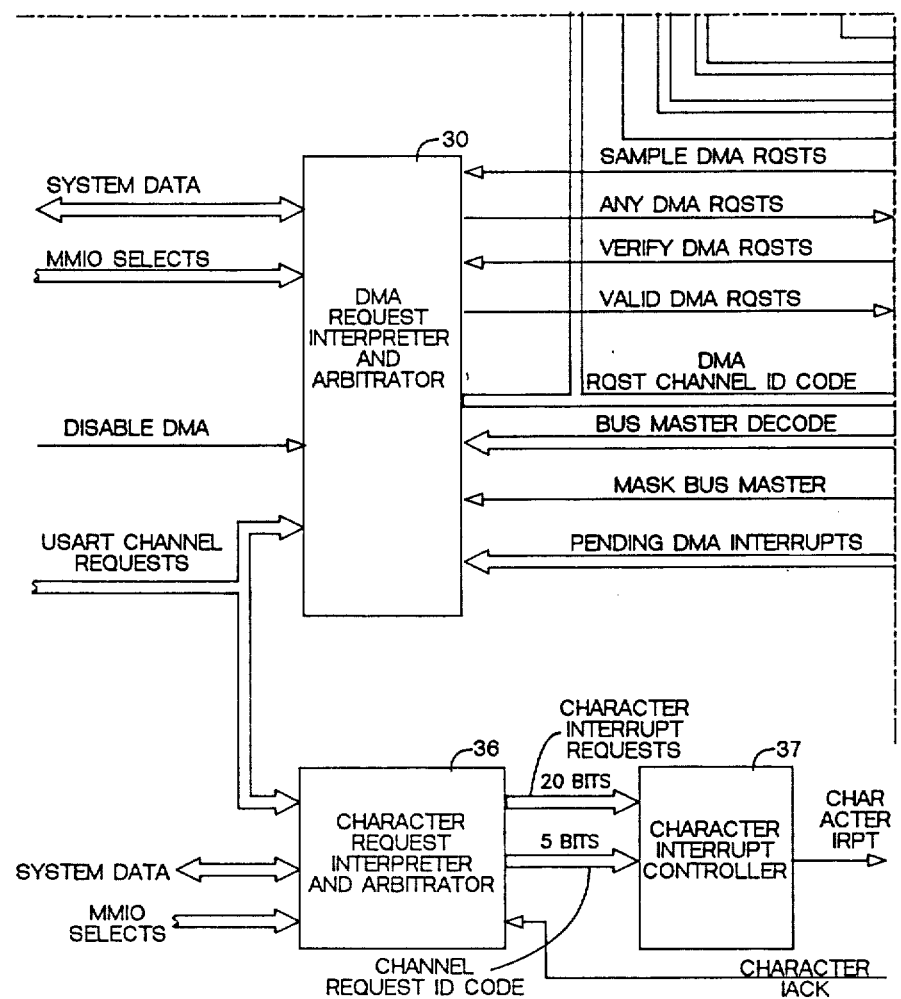
Figure 6C:
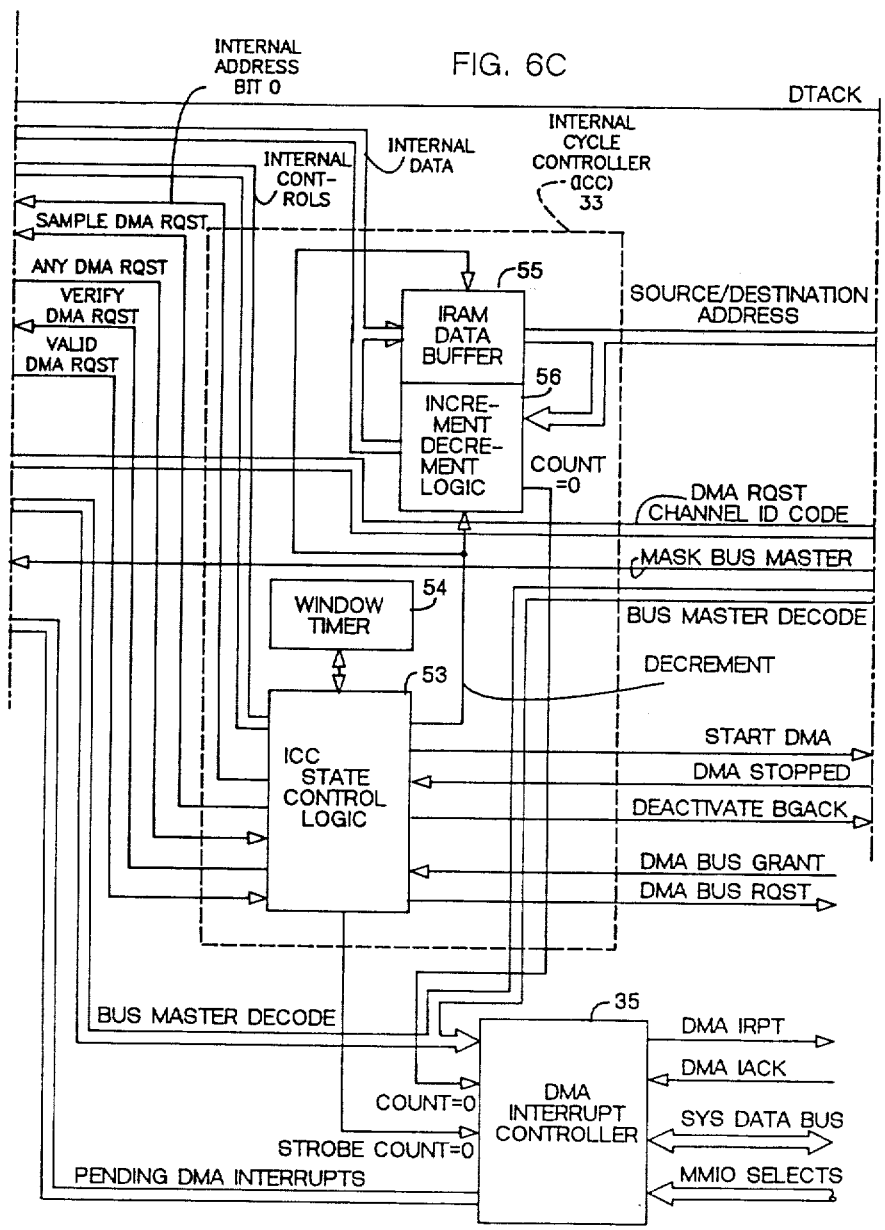
Figure 6D:
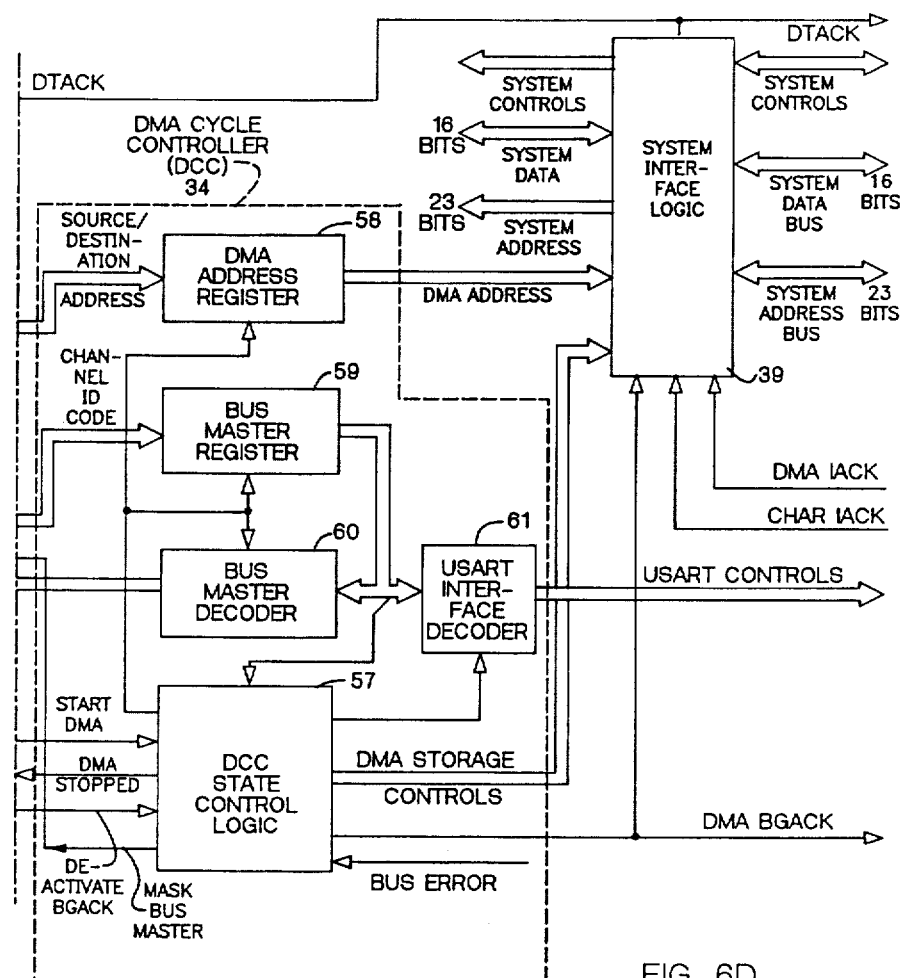

FIG. 6 represents a block diagram of the preferred embodiment of DIAC 3 as implemented in this invention. The DIAC 3 can be viewed as having two distinct and independent functions. The first function is that of executing data transfer via the DMA mode of operation. The other function is dedicated to the character interrupt driven mode of data transfer. As shown in FIG. 6, blocks 30 through 35 make up a specialized DMA transfer processor. Blocks 36 and 37 make up a specialized interrupt driven transfer processor. The DIAC 3 has an MMI/O decoder and controller 38, a data bus and the system interface logic which are shared between the two basic transfer processors.

Incoming requests may be received simultaneously by the DMA request interpreter and arbitrator 30 and by the interrupt request interpreter and arbitrator 36. Both of these units contain programmable registers. The DMA enable register #50 in FIG. 6 and the character interrupt enable register #68 in FIG. 11, indicate which channels are to be serviced in which data transfer mode. If a channel has activated a request and the DIAC 3 has been programmed to service that channel in the DMA mode, the DMA processor in blocks 30 through 35 of FIG. 6 will execute the transfer. If that channel has activated its request line and it has been programmed at the DIAC to be serviced in a character interrupt driven mode, the interrupt processor facilities of blocks 36 and 37 in FIG. 6 will service the transfer.

The choice of which channel is to be serviced and in which mode of transfer is an application specific decision based upon the choice of configuration initially stored in the programmer's EEPROM #7 in FIG. 1.

The programming of the DIAC 3 control registers is executed by the main processor 5 in FIG. 1 upon initialization. The processor 5 fetches the configuration data from the EPROM storage and writes it into the enabling registers using the appropriate memory mapped I/O addresses assigned to these registers in the main processor 5's MMI/O map. Each bit in the enable registers is mapped to a unique communication channel 0 through 19. When a bit is set on in the DMA enable register, it enables the corresponding channel to be serviced in the DMA mode. A bit set on in the character interrupt enable register similarly enables the corresponding channel to be serviced in interrupt mode.

As an example, if bits 1, 5 and 7 are set on in the DMA enable register 50, then channels 1, 5 and 7 will be serviced in the DMA mode. Similarly, if bits 0, 9 and 15 are set on in the interrupt enable register 68, then those channels will be serviced in the interrupt mode. If a given channel has neither of its corresponding bits set, then it will not be serviced at all. This aspect provides a variety of uses, the chief one being for fault isolation routines.

Example of Character Interrupt Driven Mode of Data Transfer

The character interrupt driven mode of data transfer comprises three distinct operations: arbitrating among any simultaneous request for the interrupt mode of data transfer, presenting a single interrupt to the processor 5 and providing a unique vector number for the highest priority requesting channel for the purpose of steering the processor 5 to the appropriate location in main RAM for the service routine for the given transfer on the given channel. These operations are provided in the preferred embodiment shown in FIGS. 6 and 12 as follows.

Figure 12:
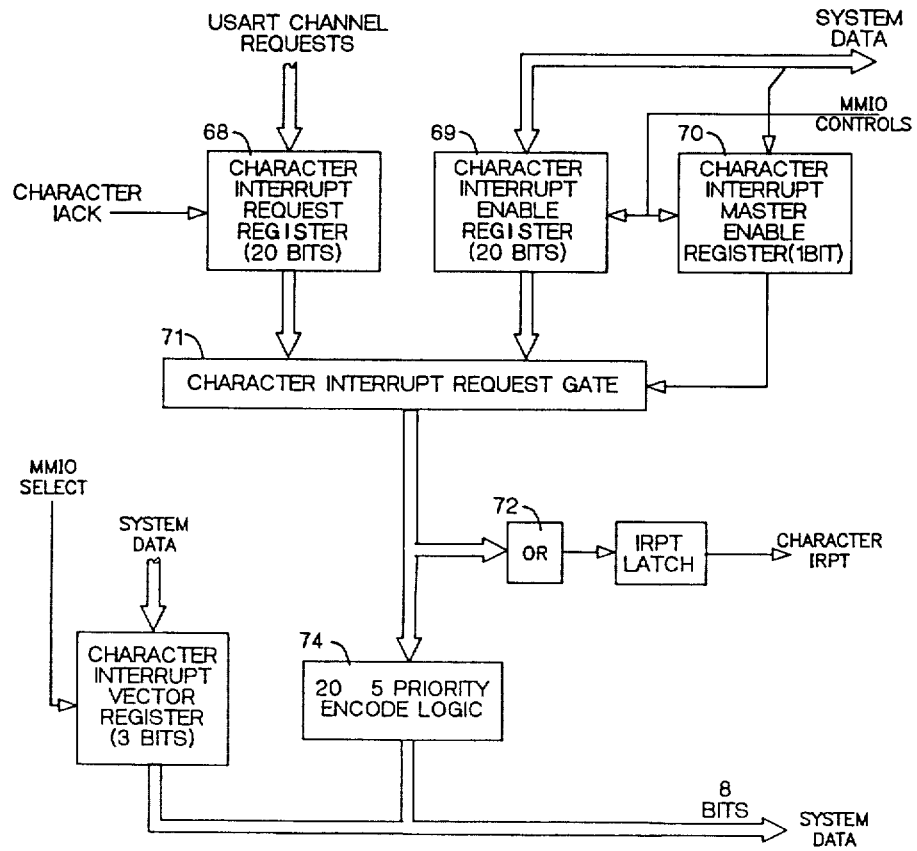
FIG. 12 illustrates in greater detail that portion of FIG. 6 in blocks 36 and 37 labeled the character interrupt controller and arbitrator.

Requests are sampled by the character interrupt request register 68 in FIG. 12 at every clock period. Channels having an active request and which have their corresponding bits set in the character interrupt enabling register 69 are interpreted as having character interrupt service requests pending. These requests may pass through the character interrupt request gate 71 provided that the character interrupt master enable register 70 is set. No requests can pass through the gate 71 if the character interrupt master enable register bit in register 70 is reset.

For purposes of illustration, assume that both channels 5 and 14 have arbitrarily been configured to be serviced in the character interrupt mode. This means that bit 5 and bit 14 have been set in the interrupt enable register 69 and bits 5 and 14 have been reset in the DMA enable register 50 of FIG. 7A. Let us further assume that odd channels are receiving channels as previously noted. Channel 5 is therefore a receive channel from USART 2 and channel 14 is a transmitter channel from USART 4. We will further assume that both channels have activated their requests at the same time and that the character interrupt master enable bit in register 70 has been set. The requests are therefore latched into the character interrupt request register 68 on the next ensuing clock period following the presentation of the requests. Since both channels are enabled for interrupt servicing, the interrupt latch 73 will be set via an output of the OR gate 72 as shown in FIG. 12. This will activate the character interrupt line to the system interrupt control logic 4 in FIG. 1 which passes the interrupt to the main processor 5.

Requests stored in the character interrupt request register #68 in FIG. 12 will pass through the request gate 71 to the priority encoding logic 74. The priority encoding logic receives all 20 input lines and generates a unique 5-bit code that represents the highest priority channel with an active enabled request. The code is a binary representation of the request number. For example, the channel connected to request 0 would have a code of 00000 and that request connected to channel 1 would be 00001, etc. This is referred to as the channel's identification number. The priority encoding scheme is based upon the physical connection of the request lines to the DIAC chip 3. The higher the number assigned to the request, the higher its priority. In this example, the code generated would be a binary 14 representing that channel 14 is the highest pending request. When the main processor 5 executes an interrupt acknowledge cycle for the character interrupt that has been presented, the system interrupt control logic #4 in FIG. 1 will activate the character interrupt acknowledge signal to the interrupt processor of FIG. 6 and to the system interface logic 39 in FIG. 6. A character IACK signal is applied also to the character interrupt request register 68 in FIG. 12 as shown.

Several effects result from this signal. The signal causes the five identification number bits of the priority encoder logic 74 in FIG. 12 to be gated onto the lower 5-bits of the data bus. It also causes the three bits stored in the character interrupt vector number register 75 to be gated onto the upper three bits of the lower half of the system data bus (bits 5, 6 and 7). This represents the interrupt vector number for channel 14.

Additionally, when the character interrupt acknowledge signal activates, the interrupt request register 68 will be frozen, i.e., locked in its present state.

Requests are not loaded into the request gate 71 until the interrupt acknowledge cycle is complete. This prevents the vector number from changing on the data bus while it is being read by the processor 5. For example, if channel 15 were to activate its request line during this cycle, the five identification number bits gated onto the data bus would change since channel 15 is of higher priority than channel 14. When the vector number is thus stable on the bus, the system interface logic 39 in FIG. 6 informs the processor 5 by activating the signal data transfer acknowledge. The processor 5 reads the vector number and then branches to the service routine in main RAM that services channel 14 in this mode of service.

Within the service routine, processor 5 executes the requested data transfer. Since channel 14 is the transmit channel, it needs to send data and must receive data for sending out on its communication line. Therefore, the processor 5 fetches a byte of data from RAM 6 or EPROM 8 where the channel 14's transmit data may be located and writes it into the transmit buffer of USART 4 that services channel 14. Once the data is written into the transmit buffer, channel 14 removes its interrupt request. Since requests are sampled at every clock period except during the IAC cycle, this in turn will reset the corresponding bit in the character interrupt request register 68 in FIG. 12.

However, since channel 5 has not yet been serviced, its request will remain active and this will maintain the character interrupt line active via OR gate 72 and the interrupt latch 73 to continually present to the system interrupt control logic 4 in FIG. 1 a request. Since an interrupt is still pending in the processor 5, the processor 5 will eventually execute another IAC cycle. Assuming that no higher priority interrupt has activated itself prior to the IAC cycle, the subsequent vector number generated in our example will be that for channel 5. Since channel 5 is a receive channel, its request will indicate that it has received a byte of data from its communication line. Processor 5 will then execute an MMI/O operation to read the receive buffer of the USART 2 handling channel 5 and to write this into the channel's buffer region in RAM 6. Channel 5 will then remove its request when its receive buffer has been read and, since there are no other active requests in this assumed example, the pending interrupt at the main processor 5 will be deactivated. All channels configured in the interrupt mode are handled in this way.

DMA Mode of Transfer—General Overview

In the DMA mode of operation, either a receive or a transmit condition may exist. In a receive operation, the USART 2 receive channel will have itself configured in DIAC 3 to be serviced in the DMA mode. A request from such a channel will indicate to the DIAC 3 that it has accumulated a byte of data from the communication line and must be serviced in the DMA mode. The DMA processor services the request by transferring the contents of the appropriate USART channel receive buffer into a specified location in RAM 6. During a transmit operation, the USART transmit channel, configured to be serviced in the DMA mode, will indicate that its buffer is empty by activating its request line. The DMA processor will then transfer the data from a specified location in RAM 6 into the appropriate USART channel 2's transmit buffer.

Since it is usually most desirable to transfer a full block of data for a given channel, the above operations can proceed without the main processor 5's intervention for a specified number of transfers. However, before any transfer can take place, the DMA processor must know which channel is being serviced, the source or destination address in RAM 6 for the data, and the number of bytes of data to be so transferred. Channel identification numbers are derived from a one-to-one mapping between request lines and USART channels.

The source and destination address and byte count information is stored in DIAC chip 3's internal RAM 31 in FIG. 6. The internal RAM is a unique aspect of the DIAC's architecture and physical structure and is itself logically subdivided into control blocks. Each channel has a dedicated control block in RAM 31 regardless of its data transfer mode of configuration. Since the DIAC chip 3 supports 20 channels, there are 20 control blocks within its internal RAM 31. Each control block contains two fields of information, the source/destination address field and the byte count field.

Figure 9:
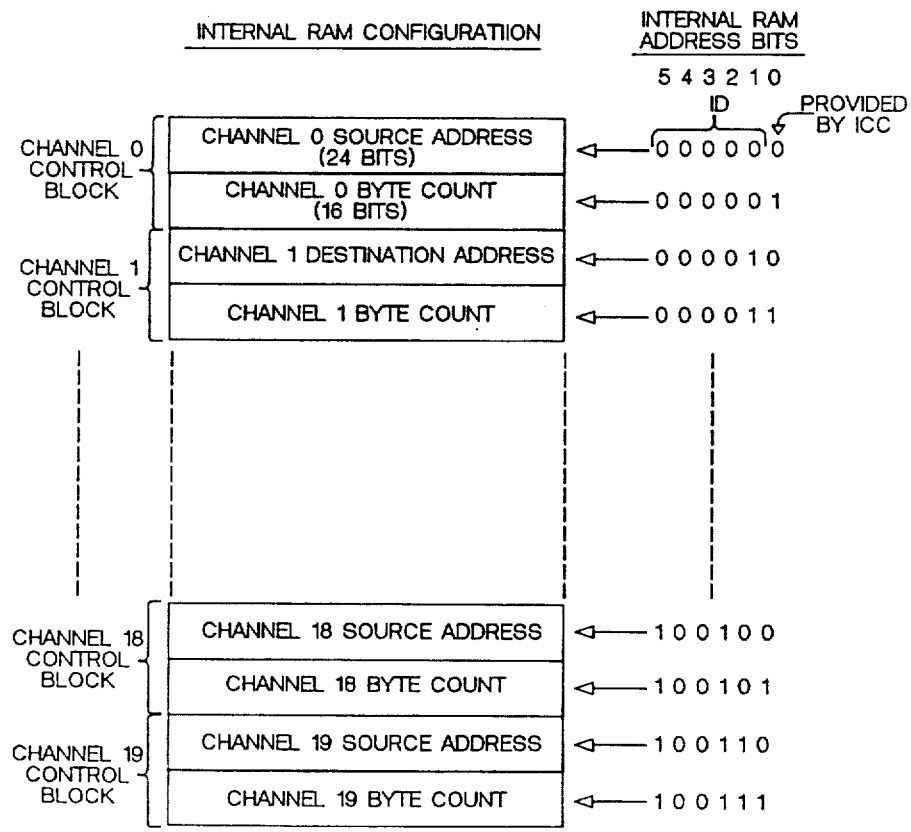
FIG. 9 illustrates the internal RAM mapping and configuration in a preferred embodiment of the DMA/interrupt controller and arbitrator in FIG. 6.

FIG. 9 shows the control block organization within the internal RAM 31 and its correspondence to the various communication channels. Every channel to be serviced in DMA mode must have its corresponding control block initialized. If the channel is designated as a receiver, its address field must contain the starting address in system memory 6 where the incoming data is to be stored. The count field must contain the number of bytes to be transferred to memory 6 before informing the processor 5. If the channel is a transmitter, the address field must contain the starting address in system memory 6 where the data is to be read and passed to the transmitter. A count field will indicate how much data is in the block to be transmitted. Both fields contain four bytes, however, only three are utilized for the DMA address and two are utilized for the byte count. The excess space is not used, but the organization thereof was dictated by the technology of implementation.

The source for these initial fields of information is in the customer programmed EPROM 8 in FIG. 1 and is fetched therefrom and maintained by the control program operating in the processor 5. The processor 5 fetches the information from the storage 8 and writes it into the DIAC 3's IRAM 31 using the appropriate MMI/O addresses for access to the IRAM. The DIAC 3 MMI/O decoder controller 38 in FIG. 6 provides the control signals for allowing the internal RAM 31 to be written and to be read by the system processor 5.

Once the system processor 5 has initialized the required internal RAM 31 control block, it can enable the corresponding channels for the DMA transfer. The processor 5 obtains the data from EPROM 8 in FIG. 1 or from RAM 6 in FIG. 1 and writes it into the DMA enabling register 50 of FIG. 7 using the appropriate MMI/O addresses for addressing register 50. Then the processor may set the DMA master enable register 51 and the DIAC 3 will be enabled for DMA transfer for that channel.

The DMA mode of data transfer consists of four distinct operations. First, there must be arbitration among any simultaneously occurring requests for DMA transfer. Second, there is an access and updating of a channel's control block. Then there is a requesting of control for the system busses and finally the execution of the DMA cycle. The DMA request interpreter and arbitrator #30 in FIG. 6 receives the request from the USART channels. It determines which channels are to be serviced in the DMA mode, prioritizes them in the case of multiple requests and indicates to the internal cycle controller 33 and to the DMA cycle controller 34 which channel is to be first serviced.

The internal cycle controller 33 (ICC) is shown in FIG. 8 and consists of state control logic 53, a window timer 54, an internal RAM data buffer 55, and an increment/decrement logic control circuit 56. The internal cycle controller 33 is responsible for sequencing the request sampling and arbitration, for fetching and updating the channel's internal RAM control block, for requesting access to the system busses and for indicating to the DMA cycle controller 34 when the beginning of a DMA cycle is to occur.

Figure 10:
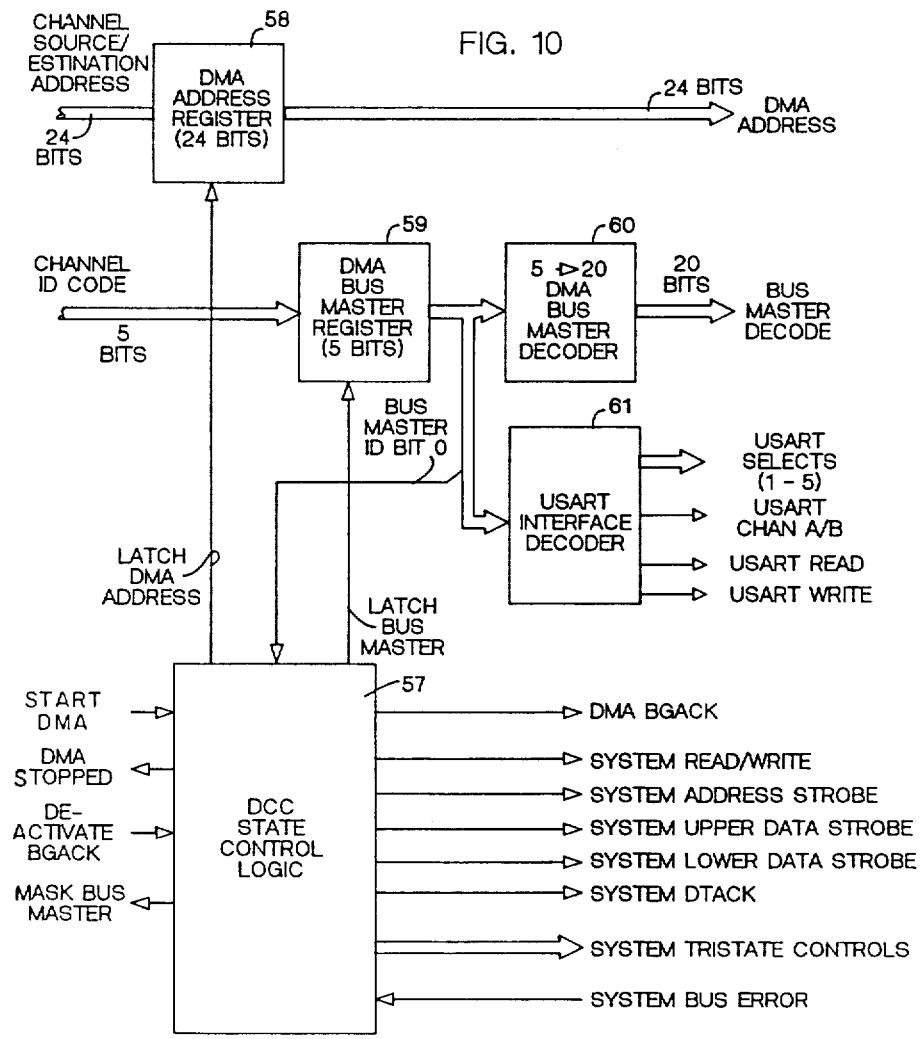
FIG. 10 illustrates in greater detail that portion of FIG. 6 contained within the block 34 and labeled the DMA cycle controller.

The DMA cycle controller 34 (DCC) is shown in FIG. 10 and it consists of a state control logic 57, a DMA address register 58, a bus master register 59, a bus master decoder 60 and a USART interface decoder 61. The DMA cycle controller 34 is responsible for the actual execution of the DMA cycle.

DMA Mode of Data Transfer—General Data and Control Flow Description

The DMA request interpreter and arbitrator 30 in FIG. 6 receives requests from the USART channels. It generates a unique code identifying the highest priority requesting channel to be serviced in the DMA mode. It passes this code, the DMA channel request identification code, to the internal cycle controller 33. Next, a series of concurrent operations occur that involve the request interpreter and arbitrator 30, the internal cycle controller 33, and the DMA cycle controller 34. First, the internal cycle controller 33 utilizes the identification code generated by the arbitrator 30 to access the channel's control block in the internal RAM 31 within DIAC 3. It fetches therefrom the source or destination address. The internal cycle controller 34 will eventually pass this address to the DMA cycle controller at an appropriate time and will also decrement the address by 1 and store it back into its original location. The internal cycle controller 33 will then request access to the system busses by activating the DMA bus request signal.

Concurrently, the arbitrator 30 will verify that the requesting channel is still requesting service and that this is not just a noise spike. The main processor 5 in FIG. 1 will eventually grant access to the system busses by activating the DMA bus grant signal. If the request has been verified as valid, the DMA cycle controller 34 will latch the address and the identification code into its registers and initiate the DMA cycle. In the meantime, the internal cycle controller 33 will have accessed the channel's byte count from its control block in internal RAM 31, decremented it by 1 and stored it back again the control block. If the byte count was detected as having been decremented to 0, the DMA interrupt control logic 35 will present an interrupt to the system interrupt control logic in FIG. 1 and disable future servicing of the channel until the interrupt has been handled by the processor 5.

If there were more than one DMA request sampled by the arbitrator 30, another identification code would be generated by arbitrator 30 and passed to the internal cycle controller 33. The internal cycle controller 33 and arbitrator 30 again operate as ncted above while the DMA cycle executes. The ICC and arbitrator will fetch new source and destination addresses and verify that the request being serviced is valid in preparation for the next succeeding DMA cycle.

There is thus a pipelining of the preparatory and execution steps between the arbitrator 30, the ICC 33 and the DCC 34 so that when the DCC finishes the current cycle, it can immediately proceed to the next one without delay; thus all channels with active requests at the time may be serviced without the latency involved in accessing RAM for the information required.

This is a unique aspect of the present invention since it is believed that DMA access controllers have not heretofor utilized RAM based information but have used register based tables that are extremely consumptive of chip space and more expensive to build.

If a given channel's byte count has been decremented to 0, the internal cycle controller 33 will inform the DMA interrupt controller 35 of the event. The interrupt controller 35 will present an interrupt to the main processor 5 and will also inhibit future servicing of the particular channel until the processor 35 explicitly resets the channel's interrupt bit. When the processor 5 acknowledges the interrupt, the interrupt controller 35 provides a unique vector number for the highest priority channel whose byte count has been decremented to 0. This steers the main processor 5 to the appropriate servicing routine in main memory 6 where it can execute any necessary processing. For example, it may be desired by the programmer that the protocol conversion must be implemented upon a receive block of data for this channel. If more than one channel's byte count has been decremented to 0, the interrupt controller 35 will keep the interrupt active and will continue presenting vector numbers until all of the individual interrupt bits have been reset.

DMA Data Transfer—Specific Example

Consider the following example for DMA transfers over two channels arbitrarily selected as channels 6 and 17. Recalling that even numbered channels are by convention in this design designated as transmit channels and that odd channels are receive channels, channel 6 is a transmit channel serviced by USART 2 while channel 17 is a receive channel serviced by USART 5.

The DIAC 3 must be properly initialized before a DMA operation can begin. Processor 5 fetches the source address for the location of transmission information for channel 6 and writes it into the MMI/O address in the internal RAM 31 which is specified for channel 6. This information is written in the source/destination address field thereof. DIAC 3 MMI/O decoder controller #38 in FIG. 6 determines that the MMI/O address represents the DIAC 3's IRAM 31. It activates the control signal enable MMI/O address, data and read/write to the internal RAM data selector 32. This allows the system data, system address bits 2 through 5 and the read/write line which is in write mode to pass to the internal RAM 31. When the data is stable and valid at the internal RAM input, the decoder controller 38 activates the signal enable MMI/O select. This passes a selection signal to the internal RAM 31 writing the data at the specified location.

The controller then activates the signal data transfer acknowledge indicating that the transfer has occurred. The processor 5 receives this signal and terminates the cycle. The processor 5 then fetches the byte count for channel 6 and writes it into the byte count field of the internal RAM 31 control block associated with channel 6.

Similar operations are performed for channel 17 except that the address field is a pointer to its destination for data since it is a receiver. The destination will be in the main memory 6.

It will be assumed that channel 6's source address is 2000 decimal and its byte count is 20 as an arbitrary example. Channel 17's destination address will be assumed at 1000 decimal and a byte count of 1.

Next, the processor 5 selectively enables channels 6 and 17 for DMA transfers by setting bits 6 and 17 on in the DMA enable register 50 of FIG. 7. This is accomplished by an MMI/O operation with the address dedicated to the DIAC 3's DMA enable register 50. The control of the operation is by DIAC 3's MMI/O decoder controller 38. The main processor 5 then sets the DMA master enable bit 51 on in FIG. 7 which enables DIAC 3 for DMA execution.

Figure 11:
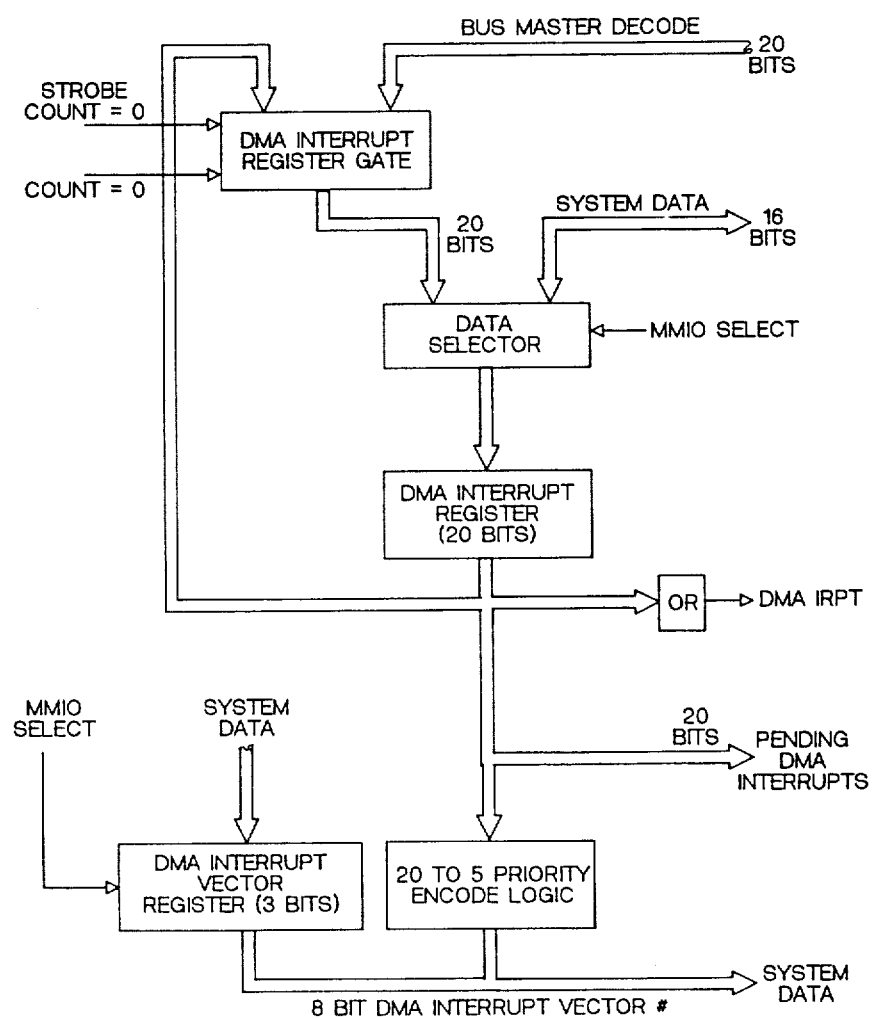
FIG. 11 illustrates in greater detail the block 35 from FIG. 6 labeled the DMA interrupt controller.

However, before any channel was actually enabled for DMA operation, the DMA processor will have entered a request and sampling mode under control of the internal cycle controller 33 of FIG. 6. The ICC 33 allows the state of the channel requests to pass directly through the line selector 42 in FIG. 7 to be latched by the DMA request register 43. This is accomplished by having the ICC 33 activate the signal sample DMA requests. The DMA request register 43 will then be loaded with the request line status at every clock period for as long as the sample DMA request's signal is active. The outputs of the DMA request register 43 passed to the DMA request gate 44. The request gate 44 will permit a particular channel's request to pass through if its corresponding bit in the DMA enable register #50 in FIG. 7 has the corresponding bit set and the corresponding bit in the DMA interrupt register #62, FIG. 11, is not set. No request will be allowed to pass if the DMA master enable bit 51 is not set.

Active signals at the output of the request gate 44 are interpreted as pending DMA requests. Pending DMA requests are individually selected according to priority and are passed to three function blocks consisting of a comparator 49, a 20-input OR gate 48, and a 20 to 5 line encoder 45. The comparator 49 is used during the special verify operation to be discussed below. The OR gate 48 is used to inform the internal cycle controller 33 whether there is one or more active DMA requests present via the signal any DMA request. The encoder 45 works in the same fashion previously described for the interrupt request encoder, i.e., the highest priority is accorded to the requester having the highest physical position. A 5-bit identification code which is the physical position code as previously discussed is given the highest priority active request status.

The internal cycle controller 33 utilizes the any DMA request signal to determine whether one or more channels require a DMA transfer. It does not sample this signal every clock period, however, because multiple DMA requests can be serviced more efficiently than the single DMA requests as will be discussed later. To enhance the probability that multiple DMA requests will be present, the internal cycle controller 33 does not sample the signal at every clock period, but waits for a window of time. The DMA window timer #54 in FIG. 8 is utilized for this purpose. The timer creates a segment of time during which requests will be sampled but no action is taken until the time window has expired. Therefore, in request sampling mode, the internal cycle controller state control logic 53 has started the DMA window timer 54 and keeps the sample DMA requests active. When the DMA window timer 54 time limit has expired, the internal cycle controller 33 deactivates the sample DMA request signal and the present state of the DMA request register #43 will be frozen temporarily. The internal cycle controller 33 the monitors the state of the any DMA request signal generated by the OR gate 48. If this signal is inactive, the internal cycle controller 33 returns to the request and sampling mode re-enabling the window timer 54 and continually loading the DMA request register 43. If the any DMA request signal is active, however, the internal cycle controller 33 prepares for a DMA cycle. Since, in this initial example, no channels have been yet enabled for DMA, the any DMA request signal remains inactive and this inhibits the DMA transfer regardless of the state of any request lines.

However, once the preparatory action described above for MMI/O initializations have taken place, DMA requests are enabled and can be serviced.

Returning to the assumption that both channels 6 and 17 have activated requests and that these have been latched in the DMA request register 43, the operation now resumes. A short time after latching the DMA request into the register 43, the DMA window timer 54 time period will expire and the state of the request register 43 will be frozen. Since both channels 6 and 17 are enabled for DMA transfers, their requests will pass through the DMA requests will pass through the DMA request gate 44. A single 5-bit code will be generated to represent channel 17 since it has the highest physical priority. This will be generated by the 20 to 5 line encoder 45 and in response, the any DMA request signal will be activated by the R gate 48. The activation of this signal puts the internal cycle controller 33 into the DMA processing mode. In this mode, several different operations proceed concurrently. The operations include accessing the channel's internal RAM control block, verifying the channel's request, and requesting from the processor 5 control of the system busses.

The internal cycle controller 33 generates the signal latch DMA request identification which stores the channel 17 identification code into the 5-bit identification code register 46. The output of this register is used as a pointer into the internal RAM 31 to identify channel 17's control block region. The 5 bits of address information pass through the internal RAM 31's MMI/O data selector #32 to a 5 of 6 internal RAM address input decoder. The internal cycle controller 33 generates the lowest order or sixth bit of the address bit 0. The internal cycle controller 33 also activates the read/write line and the selection line to the internal RAM 31. The lowest order address bit is reset to point to the source/destination address field. By convention, address fields have been designed to lie on even boundaries as shown in FIG. 9 and the read/write line is put into read mode and the selection line is activated. This results in fetching channel 17's channel address from the internal RAM 31. When channel 17's destination address has stabilized on the internal data bus, it is latched into the internal RAM data buffers 55.

Concurrently, the internal cycle controller 33 causes the arbitrator 30 to perform a verification operation denoted as verify in the figure to double check that channel 17 still has an actual request pending. This operation is performed in the following way: when the internal cycle controller 33 activates the signal verify DMA request, the output of the verification gate #40 in FIG. 7 passes through the 60 to 20 line data selector 42 and is stored in the request register 43. The verification gate compares the channel requests with the stored state of the request register 43. It only checks those bits in request register 43 which are active. Those bits in register 43 which are inactive during the verification operation remain inactive. If a channel request is active and it has its corresponding bit stored in the request register already in the active state, then the request is verified as valid and the active state of the bit is restored in the request register. This results in no change for that bit position. If, however, a channel request is inactive at the verification time, yet the corresponding bit in the request register 43 was set, the request is assumed to be invalid and the bit is reset in the request register 43.

The verified output of the request register 43 passes through the DMA request gate 44 to the inputs of the OR gate 48 and to the comparator 49. If no active requests exist as a result of the verification operation, then the signal any DMA request will be deactivated. The internal cycle controller 33, which continually monitors this signal, will then abort the pre-DMA processing steps and return to the request sampling mode. The comparator 49 is used to indicate to the internal cycle controller 33 the state of verification of the channel currently being serviced. This works in the following way: the identification code of the channel being serviced has previously been stored in the 5-bit identification code register 46. The ID lines passed to the 5 to 20 line decoder 47 which activates one of its 20 lines based upon the identification code. Each line corresponds to one of the 20 channels as previously noted. If the DMA request corresponding to the active decoded line is still active, then this indicates that the request of the channel under service is valid. As a result, the comparator 49 will activate the signal valid DMA request. There may be other requests that were reset as a result of the verification operation and noted above, but it will only be necessary to delay the pending DMA cycle and re-arbitrate if the channel indicated for service has now an invalid request. Assuming that channel 17's request remains active throughout the verification operation, the signal valid DMA request will be activated.

During this same time interval, the internal cycle controller 33 has requested control of the system busses by activating the signal DMA bus request which passes to the processor 5. This request for bus mastership is not made however until the channel source/destination address field is accessed. This assures that the internal RAM 31 access time will not delay the DMA cycle when the DIAC 3 gains control of the system busses. While the internal cycle controller 33 awaits taking of control of the system busses, it monitors the any DMA request and the valid DMA request lines. If the any DMA request is deactivated as the result of a verification operation, an MMI/O instruction executed by the processor 5 such as disabling the master enable register 51 or resetting the appropriate bits in the DMA enable register 50, or a system detected error condition, then the internal cycle controller 33 will abort its current activity, re-enable the window timer 54 and return to the request sampling operation. If the any DMA request signal is active but the valid DMA request signal is inactive, then there are still one or more channels requesting service but the specific channel whose ID was latched in the register 46 no longer has a valid request. Rather than abort the process and waste all of the pre-DMA processing that has occurred, the internal cycle controller is designed to update the ID register 46 with the next highest priority requesting channel's identification code and execute another verification cycle. When both the above request signals are active, indicating a valid request, and the main processor has activated the DMA bus grant signal back to the DIAC 3, and the system strobes are inactive, the DMA cycle can execute.

When the above conditions are all met, the internal cycle controller 33 will inform the DMA cycle controller 34 by activating the signal start DMA. This will be the first DMA cycle and since this is the case, the DMA cycle controller is currently idle. This is indicated by activation of the signal DMA stopped. When the internal cycle controller 33 indicates to the DMA cycle controller 34 that the start of a DMA cycle should occur, the DMA cycle controller internal state control logic 57 in FIG. 10 causes the source/destination address stored in the internal RAM data buffer 55 to be loaded into the DMA address register 58 of FIG. 10. The DMA cycle controller also causes the bus master register #59 to be loaded with the contents of the channel identification register 46 which, in this case, is the identification for channel 17. The contents of these registers is used for the duration of the DMA cycle.

The DMA cycle controller then activates the signal DMA bus grant acknowledge (BGACK) to indicate that it has bus mastership back to the processor 5. Next, the DMA cycle controller indicates to the internal cycle controller 33 that it has started the DMA cycle. This is indicated by the DCC 34 deactivating the signal DMA stopped. The DMA cycle controller 34 also resets channel 17's request so that the next channel, channel 6 in our example, may be queued for DMA service by activating the signal mask bus master. The signal mask bus master is used to reset channel 17's request. Channel 17's request must be selectively reset at the corresponding bit in the DMA request register 43. This is accomplished as follows:

The bus master register 59 of FIG. 10 contains the identification code for channel 17 since it is currently being serviced by the DMA cycle controller 34. This register feeds the bus master 5 to 20 line decoder #60 that activates a single line corresponding to channel 17 at its output. The outputs of the decoder go to the DMA interrupt register gate 62 and the mask bus master gate FIG. 8 #41. The one active line of the 20 possible output lines from the decoder 60 acts as a pointer for the channel's corresponding bit in the DMA interrupt register #64 in FIG. 12 and in the DMA request register #43 in FIG. 7, respectively. When the DMA cycle controller activates the signal mask bus master, the bit pointer from decoder 60 allows channel 17's bit in the DMA request register 43 to be reset. As a result, channel 17's request which is now under service is taken down out of the queue of requests awaiting service.

Concurrently with the mask bus master operation discussed above, the DMA cycle controller state machine #57 in FIG. 11, gates the channel 17 destination address which has been stored in the DMA address register 58 onto the system address bus selecting USART channel 17's receive buffer and activating the appropriate control signals so that the contents of the receive buffer may be written into location 1000 of the main memory 6. (Recall that the address assigned in main memory was assumed to be 1000 at the beginning of this example.) Two operations will always occur in one DMA cycle. If the channel is a receiver, then the DMA cycle controller will read the channel's received buffer contents and steer the data into the RAM 6. If the channel is a transmitter channel, the DMA cycle controller will read a byte from RAM 6 or other main storage area and steer it to the channel's transmission buffer. The transfer is accomplished by causing the data to pass directly between the USART channel and the main storage 6, 7 or 8 via the system data busses as shown in FIG. 1. Therefore, both a read and a write operation, either from memory to buffer or from buffer to memory, occur in the same cycle. Since odd channels are arbitrarily designated as receivers and even channels are designated as transmitters, the DMA cycle controller 34 knows the type of DMA operation to execute on the basis of the lowest order bit in the bus master register #59 of FIG. 11.

While the DMA cycle is executing, the source/destination address in the data buffer #55 of FIG. 8 is incremented by the increment/decrement logic 56 and written back into channel 17's control block address field in IRAM 31. The internal cycle controller then points to channel 17's byte count field in the internal RAM 31 by setting bit 0 of the internal RAM address on. It also converts the increment function of the increment-/decrement logic to a decrement function by activating a signal decrement as shown in FIG. 8, #53. This byte count is accessed, latched into the data buffers, decremented by 1 and restored to the original position within the IRAM 31. Since the byte count was decremented to 0 and it was assumed to be initially 1, the DMA interrupt bit corresponding to this channel will be set. This means that it is time for the processor 5 to service that receiver channel. Setting the bit is accomplished by using the bus master decode bit pointer at the output of the decoder 60 in FIG. 11 as was done for the mask bus master operation. When the byte count has been decremented to 0, the increment/decrement logic 56 activates the signal count equal 0 as shown in FIG. 8, #56. The internal cycle controller state machine 53 will validate this signal by activating the signal strobe count equals 0 when enough time has elapsed for the decrement operation to have been complete. Since the count will be 0 at this time, channel 17's bit pointer, the active decoded line in the encoder 60, allows its interrupt bit to pass through the DMA interrupt register gate #62 in FIG. 12 to be set into the DMA interrupt register 64. This activates an interrupt signal to the main processor via the output of OR gate #65 to indicate that the specific block of data has been transferred. The processor 5 doesn't recognize the interrupt until it has given back control of the busses by deactivation of the DMA bus grant acknowledge signal by the DIAC 3. The outputs of the DMA interrupt register 62 and the pending DMA interrupts feed the DMA request gate 44 and this prevents any subsequent DMA request by channel 17 from being serviced until the bit is reset. This gives back to the main processor 5 a chance for processing the channel's interrupt before the channel can gain another DMA cycle. This prevents the use of an invalid source/destination address and byte count for the next transfer.

Once the internal cycle controller 33 has updated channel 17's control block in IRAM 31, it rearbitrates any pending request in preparation for the next DMA cycle. Since channel 17's request in the request register 43 was reset by the mask bus master operation as discussed above, a code for the next highest priority requesting channel enabled for DMA will be generated by the 20 to 5 line encoder 45. In our example, channel 6 is the only other channel with a DMA request and its ID code will be generated. The internal cycle controller 33 will then cause channel 6's identification code to be loaded into the identification code register 46. This will be used to fetch the source address field, noting that channel 6 being even numbered is a transmitter from the internal RAM 31 control block. This will be stored in the data buffers 55 of FIG. 8. Concurrently, another verification operation will be performed. The internal cycle controller 33 then will await the DMA cycle controller's completion of a DMA transfer for channel 17. Rearbitration will be usually completed before any DMA cycle currently in operation completes. Thus, when the DMA cycle controller finishes a DMA cycle for channel 17, it can immediately proceed with channel 6's DMA transfer since its source address will have already been accessed by the internal cycle controller and be awaiting the DMA cycle controllers use. The DMA cycle controller 34 executes the same kinds of events as described above in processing channel 6's request. The bus grant acknowledge signal remains active. Channel 6's source address will be loaded into DMA address register 58 of FIG. 6 and its identification code will be latched into the DMA bus master register 59. Channel 6 request in a DMA request register 43 will be reset during the mask bus master operation as discussed previously. The actual DMA transfer is different, however, since channel 6 is a transmitter channel. In this case, the DMA cycle controller 34 will execute a read from location 2000 in RAM 6 and write the data into channel 6's transmit buffer.

Meanwhile, the internal cycle controller 33 will be updating channel 6's control block, incrementing its source address and decrementing its byte count. Since the byte count was not decremented to 0 (recall that the assumption was 20 bytes of data were to be transferred via DMA) no interrupt bit will be set for this channel. Next, the internal cycle controller 33 rearbitrates among pending requests. Since channel 6's request was reset by the mask bus master operation, and in our example, no other requests are pending in the DMA request register, the signal any DMA request will be deactivated in FIG. 7. The internal cycle controller 33 will then wait for the current DMA cycle to terminate after which it will relinquish bus mastership by deactivating the bus grant acknowledge signal, starting the window timer 54 again and sampling the request lines for any new requests.

When the processor 5 again regains control of the system busses, it will recognize the active DMA interrupt signal which is presented by the system interrupt control logic #4 in FIG. 1. It will eventually execute an interrupt acknowledge cycle to service the interrupt and the system interrupt control 4 will activate the DMA interrupt acknowledge signal to the DIAC chip 3. The DIAC 3 DMA interrupt control logic 35 of FIG. 6 will generate a vector number for the highest priority channel whose byte count was decremented to 0. Since channel 17 was the only channel in such a condition in this case, its identification code will be loaded into the data bus along with three bits of the DMA interrupt vector register from #67 FIG. 11. The interrupt identification code in this case is an encoded version of the contents of the DMA interrupt register 64. This is generated by the 5 to 20 priority encoding logic 66 in a fashion similar to that in which it was generated for DMA request register's contents. The interrupt identification code, along with the three DMA vector register bits from register 67 represent an 8-bit vector number. This is what the main processor 5 utilizes as a pointer for channel 17's interrupt servicing routine in RAM 6. Alternatively, the pointer could point to the EPROM or the EEPROM 7 or 8. The processor 5 will perform any desired processing based upon the contents of the memory location to which the pointer is directed and will perform these functions upon the receive data, will reinitialize channel 17's internal RAM 31 control block and will reset the interrupt bit in the DMA interrupt register, thus enabling channel 17 for further DMA transfers.

DIAC Operation When a Bus Error is Detected

The preceding discussion dealt with DMA operations which executed without error. The DIAC 3 has a means of handling DMA cycles when an error is detected by the system control logic. The signal "bus error" (BERR) is driven by the system control logic and received by the DCC 34. If the system control logic detects an error while a DMA operation is executing, it activates BERR and causes a level 7 interrupt. Since the main processor 5 is not bus master, it does not see the BERR. Furthermore, it will not recognize the level 7 interrupt until the DIAC 3 relinquishes control of the busses by deactivating BGACK. Under these circumstances, however, the DCC 34 is monitoring the BERR signal and its reaction depends on the type of DMA cycle and the time at which the BERR occurs.

If the DCC is executing a transmit operation and the BERR is detected while it is reading RAM 6 not not yet writing it into the USART 2 channel's transmit buffer, the DCC 34 will de-select the RAM 6 and not write the data to the channel. If the BERR is detected during the write operation to the USART channel 2's transmit buffer, the DCC 34 will terminate the cycle in a normal fashion.

If the DCC 34 is executing a receive operation and a BERR is detected before the write operation to RAM 6 proceeds, the DCC 34 will discontinue reading the USART 2 channel receive buffer and terminate the cycle without writing data into the RAM buffer region. If the RAM write operation is executing when the BERR is detected, the cycle terminates in a normal fashion.

In any case, the DCC 34 will not return to its "DMA STOPPED" state until BERR is deactivated, preventing subsequent execution of pending DMA cycles. Once BERR deactivates, normal operation can proceed. In the preferred implementation, it is required when an error is detected, an attempt is made to identify the cause and recover if possible. To aid in the diagnosis, an attempt is made to preserve the state of the machine as much as possible when the error occurred. The DIAC 3 has a means to preserve its state when the signal 'DISABLE DMA' activates. This signal is driven by the system control logic whenever an error is detected and remains active until the system recovers. It is received by the DMA request interpreter and arbitrator 30 and effectively masks all DMA requests. This deactivates all pending DMA requests and prevents subsequent DMA cycles from executing by keeping the DIAC 3 in request smapling mode. If the error was detected during a DMA cycle, the main processor 5 can determine the channel that was being serviced at the time of the error by interrogating the DMA bus master register 59 with the appropriate MMIO operation. Furthermore, having determined the channel ID, the main processor 5 can determine the source/destination address and byte count for further analysis. Once the DISABLE DMA signal is deactivated by the system control logic, DMA service can proceed.

Summary of Operation

The DIAC architecture provides a universal interface in which communication channels may be serviced in an optimal fashion as dictated by the system environment with parameters as selected by a system programmer. The requirements on the communication channel devices themselves to meet such an interface are minimal. Each channel is provided with a dedicated request line which activates when it requires a data transfer and which deactivates when the transfer is made. The DIAC 3, appropriately programmed by a customer programmable EPROM code which is loaded into the DIAC 3 by the processor 5, provides the necessary controls to facilitate the data transfer through an interrupt or DMA mode of operation in a manner that is completely transparent to the communication channel USART devices. If a channel is programmed to be serviced in interrupt mode, the DIAC 3 has an interrupt processor to provide the arbitration, the interrupt signal, the interrupt vector and the data transfer acknowledgement to allow the processor 5 to execute the data transfer for the highest priority requesting channel. If the channel is programmed to be serviced in DMA mode, DIAC 3's DMA processor section provides arbitration, the system bus acquisition, the execution of the proper type of DMA transfer and, if applicable, it will also present an interrupt, generate an interrupt vector and provide the data transfer acknowledgement to the main processor 5.

A significant feature of the architecture of DIAC 3 is its multi-channel DMA transfer capability and its pipelining architecture in the internal cycle controller which performs the housekeeping chores for the DMA cycle controller. Given this architecture, and an internal RAM for storing a large number of channel control block areas, the programmably adjustable protocol adapter and port interface communications controller of the present invention has the capability of servicing 20 channels in the example given but is limited only by the size of internal RAM. Hence, the capability for a multiple channel DMA controller on a single chip with a high number of channels such as 20 or more is clearly available. Typically, the source/destination address pointer for main RAM and a data byte transfer count for each channel will be stored in dedicated register in prior art machines. Since these registers occupy a significant amount of chip real estate, only a few channels may be serviced in DMA mode for a given DMA controller chip. An example would be the Motorola 6844 which can service four channels. Random access memory is a much more efficient means for storing information in terms of chip real estate, but is much less efficient in terms of data access time. The pipelined architecture of the DIAC's DMA processor with internal cycle controller virtually eliminates the effects of the internal RAM 31 access delay time on system performance as noted above.

Another significant feature of this design is the manner in which the DMA processor is designed for maximizing system performance. First, a request for control of the system busses is not presented until arbitration has concluded and the internal cycle controller has already accessed the source and destination address fields for the channel to be serviced. Therefore, when control of the system busses is relinquished to the DMA controller, the DMA cycle can proceed immediately and the internal RAM access time has been eliminated insofar as the DMA process is concerned. Secondly, the concurrent operation of the internal cycle controller and the DMA cycle controller enables the required internal processing to execute during DMA transfer times. The updating of the channel control block, rearbitration for the next highest priority channel, and access to the channel's control block, all occur during the DMA transfer handled by the internal cycle controller. If the operations were to occur in a serial fashion, the overall throughput of the DIAC 3 DMA capability would be severely reduced as can be appreciated.

Another aspect of novelty in which the DIAC 3 design attempts to maximize system performance if by utilizing the window timer 54. The DIAC 3 can execute multiple DMA transfers within the same bus mastership period, i.e., during the time that the DMA bus grant acknowledge signal is active much more efficiently than a single isolated transfer. This is because subsequent transfers can execute without executing the bus acquisition protocol necessary to gain initial control of the busses. Since the DIAC 3 will have already gotten control of the system busses, it can keep control until the DMA bus grant acknowledge is deactivated. This can occur without waiting for rearbitration and control block accesses due to the pipelined internal cycle controller operation. The window timer increases the probability that multiple DMA requests will be pending during the request sampling period and thereby increase the overall efficiency of DMA transfer operations.

Line Speed and Parity Detection

The design shown in the figures implements a baud rate or line speed and parity convention detection for multiple incoming asynchronous or synchronous digital data streams.

Each port interface controller and USART combination 2 contains a transition detection network 80 for each port 1. The transition detection network 80 monitors the incoming receive data line for changes in the binary status, either from 0 to 1 or from 1 to 0 and indicates a change whenever a change in binary status occurs. This is the source of the level 5 interrupt request lines in FIG. 3 emanating from port interface controller 10 to the interrupt control logic 4. Within the port interface controller 10, there exist interrupt registers for maintaining the current status and the historical status of interrupts from each port. The interrupt status register 81 is included as part of the port controller 10 as is shown separately in FIG. 13.

An interrupt bit is set in the interrupt register 81 in the controller 10. A bit is set in this register whenever a transition is detected or whenever an MMI/O operation is issued by the processor 5. The bits may be set by system reset, by an MMI/O write operation or by an MMI/O reset under mask as discussed above. The vector generation and arbitration unit 82 contains vector generating components which provide unique vector numbers for each channel to steer the processor 5 to the appropriate location in memory for servicing the highest priority interrupt data channel transition. These vector numbers are for application to the data bus. A level 5 interrupt on data transitions is issued as shown in FIG. 3 to the interrupt control logic 4 of FIG. 1 and to the system processor 5 which are shown together in a single block in FIG. 13. A free running timer which is the programmable timer 13 is provided in the system for the purpose of determining the elapsed time between data transitions on a given port. The timer runs continuously and is read by the processor 5 when a level 5 data transition interrupt occurs. Since an interrupt will be provided each time a data transition occurs on a given port, the port having the highest priority activity will succeed in presenting a series of interrupts sequentially to the processor 5. Each interrupt causes a reading and storage of the programmable timer's count. When a complete character has been received, the timing intervals between data transitions give an indication of the baud rate and parity conventions utilized on that port.

This facility is required so that modem support for various baud rates can be achieved. Multiple speed modems are now commonplace and since remote modems of differing baud rates could dial into a locally attached modem at a given port 1, some means must be provided for determining the baud rate and parity conventions implemented by the remote modem. This can be determined from the received signal as has been done for single ports conventionally for some time. A predetermined character is sent by a remote user once a link has been established. The character is for the purpose of baud rate and parity convention identification. The total number of transitions is used to indicate parity. Timings between transitions will indicate speed. Appropriate processing algorithms exist, given the measurements, for determining what the line speed actually is. A predetermined character is employed because it is associated with a fixed number of transitions when it is transmitted serially across a communication link. At reception, each transition is time stamped with the present time in the free running timer 13 and stored. After the entire character has been received, the processor 5 can determine the effective baud rate and parity conventions using known algorithms.

As discussed above, the occurrence of any transition causes an interrupt to be generated on one of the 10 (receive only) interrupt request lines. When the interrupt is serviced, a unique vector, identifying the highest priority channel then requesting an interrupt is presented to the system processor as has been fully explained earlier. During the interrupt servicing, the interrupts are sorted by port identification, are time stamped and are stored in memory for off-line processing. The interrupts are then reset so as not to affect the detection of further transitions. When all the transitions have been received for any given port, the system processor determines the effective baud rate and parity convention used on that port. When a channel has been thus identified, the transition detection capability is disabled in order to proceed with normal data traffic.

Figure 13:
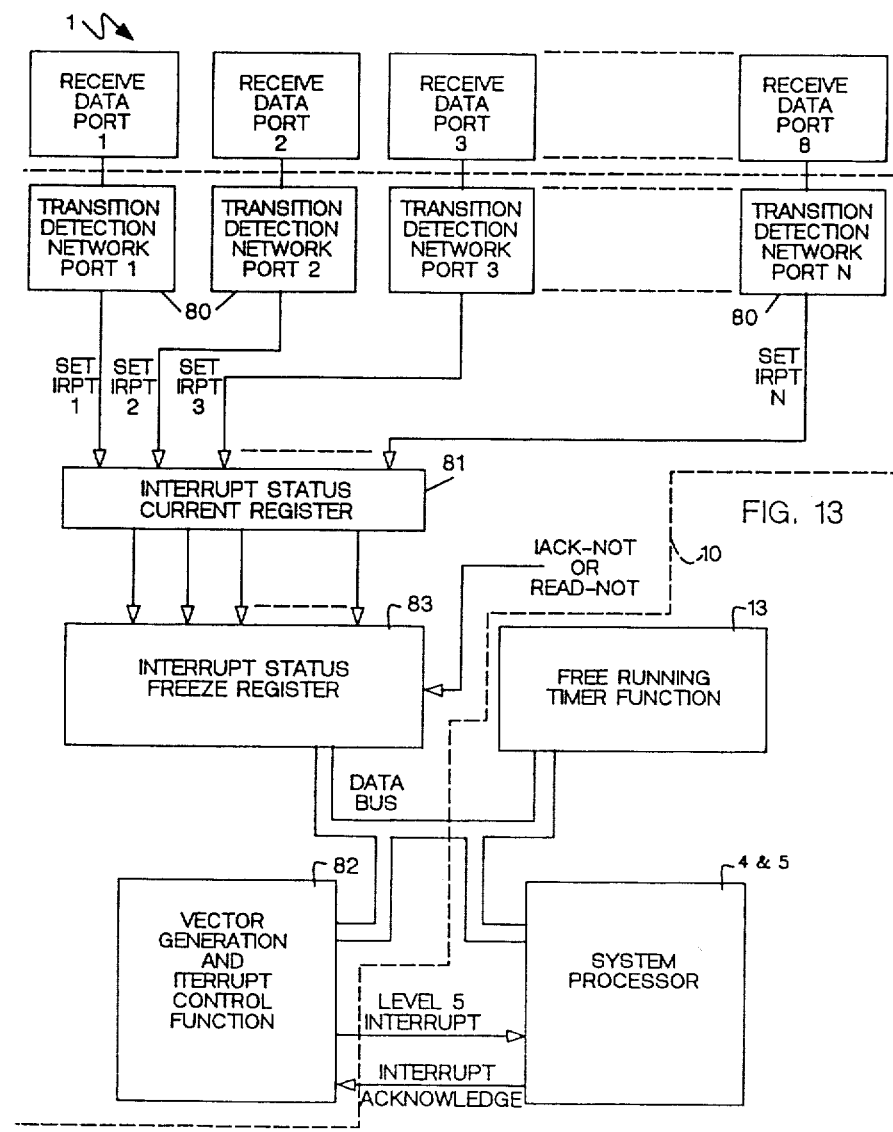
FIG. 13 is a detailed control and data flow path for the port interface controller block 10 in FIG. 5.

In FIG. 13, the detection of valid transitions is accomplished by the receive data transition input to each channel. This is shown by the transition detection network which may be embodied in either the port interface controllers 10 as shown in FIG. 3 and previously described. Each network monitors the state of the single receive data input in order to determine the occurrence of a transition. A transition is, as defined above, a change in the receive data state from logical 1 to logical 0 or vice versa. The signal "set interrupt" is activated as a momentary pulse whenever such a transition is detected. The interrupt status register 81 and the interrupt holding register 83 are shown in FIG. 13. The current status register 81 collects transitions from all incoming channels as they occur. The set interrupt inputs are used to control individual bit positions within this register as previously described with priority being represented by the highest number of channels present. A bit is set whenever the "set interrupt" signal is activated. Each bit is then individually reset under mask or reset during a general system reset as previously discussed. The reset under mask is, as previously described, accomplished by selecting the assigned address space for the desired interrupt status register along with activation of the appropriate controls and data. Due to the asynchronous behavior of multiple incoming channels, it is necessary to provide a means of selecting and resetting individual bit positions without affecting the remaining ones. This has been provided as shown above by the capability of simultaneously resetting an individual channel while detecting new transition occurrences under remaining channels using the reset under mask provision.

The interrupt status register 81 is constantly updated by the interrupt status input register except during an MMI/O read cycle or an interrupt acknowledge cycle.

[During these cycles, it will be required that the data be stable within the register 81 to insure accurate data transfer to the system processor 5.] At the completion of a read or of an acknowledge cycle, the interrupt status register 81 resumes the updating process. The insures that the detection of asynchronously occurring interrupts on remaining channels will be observed by simultaneously the performance of either a read or an acknowledge cycle is being conducted for interrupts already detected. The status holding register 68 may be written by an MMI/O operation for functional test purposes.

As detailed above in the description of the port interface controller 10's operation, the presentation of interrupts is controlled by the vector generation and interrupt control functions by generator 82. When channels are enabled, transitions are latched within the interrupt status register 81 and are consequently presented to the system processor 5 by activation of the signal interrupt on level 5. This signal is logically ORed from the result of all enable channels that are detecting a transition. A unique vector is generated as described earlier for the bidding port having the highest priority concurrently present with the activation of the interrupt signal. When the interrupt acknowledge signal is presented to the interrupt control network 82 by processor 5, vector generator 82 presents a vector to the processor 5 on the data bus. The vector represents the highest priority channel detecting a data transition. Once the interrupting port has been identified, the system processor 5 reads the free running timer 13 to establish the respective transition times between the previous interrupt on the same port, etc. The processor 5 then issues the reset under mask command to reset the respective interrupt status bit in the register 81. The entire procedure is repeated for subsequent interrupts occurring on any of the channels with the results stored separately in accordance with the vector identifications for each. When the complete set of transitions sufficient for the first full known character has been received, the processor 5 can assess parity and baud rate findings for that port.

Having thus described our invention with reference to a preferred embodiment thereof, it will be evident to those of skill in the art that numerous departures and/or substitutions for the various component functional blocks such as a microprocessor, the USARTs, the memory modules and the like may be made without departing from the spirit and scope of this invention. Therefore, what is desired to be protected by Letters Patent and which is set forth in the claims appended hereto is met by way of description only and not by way of limitation.

What is claimed is:

1. A multi-port communications system data transfer service combined interrupt request/DMA request arbitrator, direct memory access controller and interrupt driven access controller for a bus inter-connected processor and memory system providing communications services, comprising:

a communications port service request arbitration means connected to a plurality of communications ports and receiving therefrom a plurality of contemporaneous interrupt and/or DMA requests for data transfer service, said arbitration means having a means for identifying the highest priority service request from among said contemporaneous requests and means for issuing a channel identification therefor;

a direct memory access control means connected to said arbitration means for receiving said channel identification and responsive thereto for issuing a direct memory access bus request to said processor; and a data buffer and a state control logic means, said state control logic means being connected to said processor and responsive to a receipt from said processor of a bus grant signal for causing issuance from said buffer to said processor of a direct memory access address identifying the memory location for reading or writing data; and an interrupt control means connected for receiving said channel identification from said arbitration means and responsive thereto for issuing interrupt signals to said processor; and said interrupt control means being responsive to the receipt of an interrupt acknowledgement signal from said processor for issuing a memory address vector for locating the start of an interrupt program for handling said interrupt.

2. Apparatus as described in claim 1, wherein said direct memory access control means further comprises:

randomly accessible memory, a memory access control means for said randomly accessible memory, and a direct memory access cycle control means for said memory;

said memory access control means utilizing said channel identification for accessing said random access memory for retrieving therefrom a memory address where the data to or from said channel is to be located;

and said direct memory access cycle control means issues to said processor said retrieved memory access as a direct memory access address upon receipt of said bus grant signal from said processor.

3. Apparatus as described in claim 2, wherein said memory access control means further comprises a random access memory access selector means and;

means for receiving said channel identification; and means responsive to said receipt of said channel identification for issuing control signals to said random access memory access selector means to gate said channel identity thereto; and a random access memory data input and output buffer;

said buffer being connected to said direct memory access control means and to said random access memory for temporarily holding source or destination addresses from said random access memory for access by said direct memory access control means and;

random access memory address increment and decrement logic means connected to said direct memory access control means for detecting the end of the byte count field for a direct memory access data transfer.

4. Apparatus as described in claim 3, wherein said direct memory access cycle controller comprises:

a direct memory access address register connected to said random access memory data buffer and to said direct memory access control means for receiving and issuing said direct memory access address;

a bus master identification register connected to said arbitration means for receiving said channel identification; and a bus master identification decoder connected to said bus master identification register for decoding said identification and providing an indication of which said channel is bus master for said bus of said processor and memory system.

5. Apparatus as described in claims 2 through 4, wherein said random access memory comprises:
   a plurality of data storage cells for holding control block data information associated with each said channel, said control block data defining whether DMA or interrupt service mode is accorded to each said channel and for defining the location in memory for said data transfer for each said channel; and,
   memory access means for selectably reading or writing said data storage cells to construct a said control block of data within said random access memory.

6. Apparatus as described in claims 2 through 4, further comprising:
   system interface logic means connected to said direct memory access control means and to said system busses of said processor and memory for supplying direct memory access addresses and controls to said busses;
   said system interface logic means also being connected to said memory access control means of said random access memory for supplying random access memory data and, address thereto for reading or writing said random access memory.

7. Apparatus as described in claim 1, wherein said interrupt control means further comprises:
   a character service interrupt control means connected to said arbitration means and receiving said channel identification therefrom; and
   a direct memory access service interrupt control means connected to said direct memory access control means; and
   said interrupt control means supplying interrupt signals to said processor and memory system.

8. Apparatus as described in claim 7, wherein said direct memory access interrupt control means further comprises:
   gate means for receiving an indication of the identity of the present bus master for gating said identity;
   storing means connected to said gate means for receiving said identity and storing it;
   interrupt signalling means connected to said storing means for signalling a processor interrupt;
   encoding means connected to said storing means for encoding a representation of said identity for output as a portion of the base address for said processor to locate the start of an interrupt servicing program for said bus master.

9. Apparatus as described in claim 7, wherein said character interrupt control means further comprises:
   storage means for receiving channel service requests; and
   character interrupt enabling means connected to the data bus for receiving channel interrupt mode enabling signals; and
   comparison means connected to said storage means and to said character interrupt enabling means for providing an indication to said processor whenever a requesting channel's request compares with said channel's enabling signal in said enabling means; and
   encoding means connected to said comparison means for providing a partial indication of a base address in system memory where a service routine for said enabled channel resides.

10. Apparatus as described in claims 2 through 4 wherein said memory access control means further comprises:
    means for increasing the probability of the occurrence of multiple pending direct memory access data transfer service requests.

11. An integrated multi-port direct memory access and interrupt arbitration and control means, comprising:
    a data transfer mode selector means for defining whether either the direct memory access or interrupt mode of data transfer service exists for each requesting port;
    a direct memory access transfer processor connected to said mode selection means and responsive thereto for performing a direct memory access mode data transfer at each requesting port defined as having said direct memory access mode of data transfer;
    an interrupt driven transfer controller connected to said mode selection means and responsive thereto for performing an interrupt mode data transfer at each requesting port defined as having said interrupt mode of data transfer.

12. Apparatus as described in claim 11, wherein said interrupt driven transfer controller further comprises:
    an interrupt mode request priority arbitrator for identifying the highest priority interrupt mode request present among contemporaneous competing requests therefor.

13. Apparatus as described in claim 12, wherein said interrupt driven transfer controller further comprises:
    a character interrupt controller connected to said request arbitrator for presenting an interrupt to a system microprocessor and responsive to an interrupt acknowledgement therefrom for presenting base address and controls necessary for enabling said interrupt to be processed by said microprocessor.

14. Apparatus as described in claim 11, wherein said direct memory access transfer controller further comprises:
    a direct memory access mode request arbitrator for selecting the highest priority direct memory access mode request from among any contemporaneous competing requests therefor for processing.

15. Apparatus as described in claim 12, wherein said direct memory access transfer controller further comprises:
    a direct memory access mode request arbitrator for selecting the highest priority direct memory access mode request from among any contemporaneous competing requests therefor for processing.

16. Apparatus as described in claims 14 and 15, wherein said direct memory access transfer controller further comprises:
    an internal cycle controller and a random access memory, a and bus access control logic means;
    said internal cycle controller accessing said random access memory and fetching control information to be used with said highest priority request;
    said internal cycle controller initiating said direct memory access and controlling said bus access logic.

17. Apparatus as described in claims 11 through 15, wherein said direct memory access request arbitration means further comprises:
    means for enabling said direct memory access arbitration means to accumulate multiple pending requests for DMA service.

* * * * *